US009008730B2

(12) United States Patent
Kim et al.

(10) Patent No.: US 9,008,730 B2
(45) Date of Patent: Apr. 14, 2015

(54) MOBILE TERMINAL CAPABLE OF PROVIDING MULTI-HAPTIC EFFECT AND METHOD OF CONTROLLING THE MOBILE TERMINAL

(75) Inventors: Jong Hwan Kim, Seoul (KR); Kwang Ho Eom, Seoul (KR); Moo Ryong Ryu, Seoul (KR); Jeong Hwa Kim, Seoul (KR); Jung Mi Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 715 days.

(21) Appl. No.: 12/764,047

(22) Filed: Apr. 20, 2010

(65) Prior Publication Data
US 2010/0267424 A1 Oct. 21, 2010

(30) Foreign Application Priority Data

Apr. 21, 2009 (KR) .................. 10-2009-0034744

(51) Int. Cl.
| | |
|---|---|
| H04B 1/38 | (2006.01) |
| G06F 3/041 | (2006.01) |
| G06F 3/0488 | (2013.01) |
| G06F 3/01 | (2006.01) |
| H04M 1/725 | (2006.01) |
| H04M 1/2745 | (2006.01) |
| H04M 1/57 | (2006.01) |
| H04M 19/04 | (2006.01) |

(52) U.S. Cl.
CPC ............ *G06F 3/04883* (2013.01); *G06F 3/016* (2013.01); *H04M 1/27455* (2013.01); *H04M 1/57* (2013.01); *H04M 1/72519* (2013.01); *H04M 19/047* (2013.01); *H04M 2250/22* (2013.01)

(58) Field of Classification Search
USPC ............ 455/566, 411; 345/156, 173, 87, 168; 340/407.1–407.2; 715/784
See application file for complete search history.

(56) References Cited

U.S. PATENT DOCUMENTS

| | | | | |
|---|---|---|---|---|
| 8,125,347 | B2* | 2/2012 | Fahn | 340/815.4 |
| 8,335,993 | B1* | 12/2012 | Tan | 715/773 |
| 2008/0024459 | A1* | 1/2008 | Poupyrev et al. | 345/173 |
| 2009/0167509 | A1* | 7/2009 | Fadell et al. | 340/407.2 |
| 2009/0228792 | A1* | 9/2009 | van Os et al. | 715/702 |
| 2009/0322498 | A1* | 12/2009 | Yun et al. | 340/407.2 |
| 2010/0192086 | A1* | 7/2010 | Kocienda et al. | 715/773 |
| 2010/0231537 | A1* | 9/2010 | Pisula et al. | 345/173 |
| 2010/0231539 | A1* | 9/2010 | Cruz-Hernandez et al. | 345/173 |

(Continued)

FOREIGN PATENT DOCUMENTS

| | | |
|---|---|---|
| DE | 10126466 | 12/2002 |
| DE | 102005048230 | 4/2007 |

(Continued)

*Primary Examiner* — Khawar Iqbal
(74) *Attorney, Agent, or Firm* — Lee, Hong, Degerman, Kang & Waimey

(57) ABSTRACT

Method for providing feedback includes detecting user input relative to a location of a display of a mobile terminal, such that the user input includes an initial region of input and an ending region of input. One operation includes generating, responsive to the user input, a first haptic feedback at a first location of a mobile terminal, such that the first location corresponds to the initial region of input. Another operation includes generating, responsive to the user input, a second haptic feedback at a second location of the mobile terminal, such that the second location corresponds to the ending region of input, and the second haptic feedback begins at a point of time that occurs after the first haptic feedback has begun.

21 Claims, 34 Drawing Sheets

(56) References Cited

U.S. PATENT DOCUMENTS

| | | | |
|---|---|---|---|
| 2010/0231612 A1* | 9/2010 | Chaudhri et al. | 345/684 |
| 2010/0235785 A1* | 9/2010 | Ording et al. | 715/810 |
| 2011/0154188 A1* | 6/2011 | Forstall et al. | 715/236 |
| 2012/0162119 A1* | 6/2012 | Forstall et al. | 345/173 |
| 2014/0028600 A1* | 1/2014 | Ording et al. | 345/173 |
| 2014/0145994 A1* | 5/2014 | Burrough et al. | 345/173 |
| 2014/0237360 A1* | 8/2014 | Chaudhri et al. | 715/702 |

FOREIGN PATENT DOCUMENTS

| | | |
|---|---|---|
| EP | 1310860 | 5/2003 |
| EP | 1731993 | 12/2006 |
| WO | 99/05583 | 2/1999 |
| WO | 2008/042745 | 4/2008 |

* cited by examiner

MOBILE TERMINAL CAPABLE OF PROVIDING MULTI-HAPTIC EFFECT AND METHOD OF CONTROLLING THE MOBILE TERMINAL

CROSS-REFERENCE TO RELATED APPLICATIONS

This application claims benefit of earlier filing date and right to priority to Korean Patent Application No. 10-2009-0034744, filed on Apr. 21, 2009, the contents of which are hereby incorporated by reference herein in their entirety.

BACKGROUND OF THE INVENTION

1. Field of the Invention

The present invention relates to a mobile terminal, and in particular to a mobile terminal providing various haptic effects.

2. Description of the Related Art

Mobile terminals are portable devices, which can provide users with various services such as a voice calling service, a video calling service, an information input/output service, and a data storage service.

As the types of services provided by mobile terminals become more diversified, an increasing number of mobile terminals are being equipped with various complicated functions such as capturing photos or moving pictures, playing music files or moving image files, providing game programs, receiving broadcast programs and providing wireless internet services. As such, mobile terminals have evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals, such as a double-sided liquid crystal display (LCD) or a full touch screen, has steadily increased due to the growing perception that mobile terminals represent personal individuality.

However, there is a restriction in allocating sufficient space for a UI, such as a display device or a keypad, of a mobile terminal without compromising the mobility and the portability of a mobile terminal. In addition, there is also a restriction in properly responding to various user commands due to limited UI space. Therefore, it is useful to develop ways to control the operation of a mobile terminal using a new data input/output method, other than an existing visual representation-based simple data input/output method, to efficiently use various functions provided by the mobile terminal.

SUMMARY OF THE INVENTION

In accordance with an embodiment, a method for providing feedback includes detecting user input relative to a location of a display of a mobile terminal, wherein the user input comprises an initial region of input and an ending region of input; generating, responsive to the user input, a first haptic feedback at a first location of a mobile terminal, wherein the first location corresponds to the initial region of input; and generating, responsive to the user input, a second haptic feedback at a second location of the mobile terminal, wherein the second location corresponds to the ending region of input, and wherein the second haptic feedback begins at a point of time that occurs after the first haptic feedback has begun.

In accordance with another embodiment, a mobile terminal includes a display; an input sensor configured to detect user input relative to a location of the display, wherein the user input comprises an initial region of input and an ending region of input; a first haptic feedback element configured to generate, responsive to the user input, a first haptic feedback at a first location, wherein the first location corresponds to the initial region of input; and a second haptic feedback element configured to generate, responsive to the user input, a second haptic feedback at a second location, wherein the second location corresponds to the ending region of input, and wherein the second haptic feedback begins at a point of time that occurs after the first haptic feedback has begun.

In accordance with yet another embodiment, a method for providing feedback includes displaying an object on a display of a mobile terminal; detecting first user input and second user input relative to the display and proximate to the object; determining a decrease in relative distance between the first and second user input, wherein the decrease in relative distance occurs when there is a relative decrease in distance between a location of the display associated with the detected first user input and a location of the display associated with the detected second user input; determining an increase in relative distance between the first and second user input, wherein the increase in relative distance occurs when there is a relative increase in distance between a location of the display associated with the detected first user input and a location of the display associated with the detected second user input; generating, responsive to the detecting of the first user input, a first haptic feedback at a first location of the mobile terminal; generating, responsive to the detecting of the second user input, a second haptic feedback at a second location of the mobile terminal; providing a relative increase in intensity of the second haptic feedback responsive to the increase in relative distance; and providing a relative decrease in the intensity of the second haptic feedback responsive to the decrease in relative distance.

In accordance with a further embodiment, a method for providing feedback includes receiving, at a mobile terminal, a communication from a third party, the communication being one of a plurality of different communication types; and generating one of a plurality of haptic feedback operations according to which of the plurality of different communication types the communication relate is.

BRIEF DESCRIPTION OF THE DRAWINGS

The above and other features and advantages of the present invention will become more apparent by describing in detail preferred embodiments thereof with reference to the attached drawings.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The term "mobile terminal," as used herein, may indicate a mobile phone, a smart phone, a laptop computer, a digital broadcast receiver, a personal digital assistant (PDA), a portable multimedia player (PMP), or a navigation device. In this disclosure, the terms "module" and "unit" can be used interchangeably.

Figure 1:
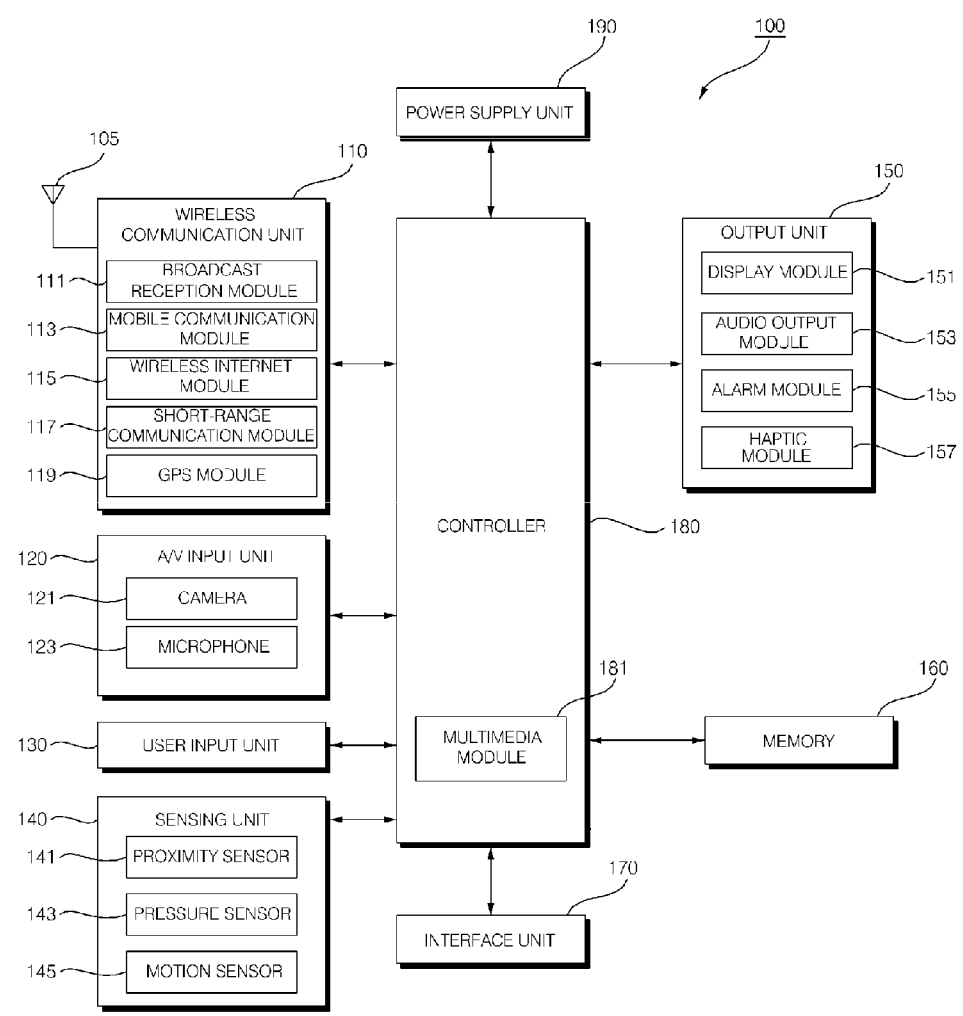
FIG. 1 illustrates a block diagram of a mobile terminal in accordance with various embodiments of the invention.

FIG. 1 illustrates a block diagram of a mobile terminal 100 in accordance with various embodiments of the present invention. As shown in FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1. It should also be understood that one or more of the components shown in FIG. 1 can be incorporated within a single component and, alternatively, one or more of the components shown in FIG. 1 can be configured using multiple components.

The wireless communication unit 110 may include a broadcast reception module 111, a mobile communication module 113, a wireless internet module 115, a short-range communication module 117, and a global positioning system (GPS) module 119.

The broadcast reception module 111 receives broadcast signals and/or broadcast-related information from an external broadcast management server via a broadcast channel. The broadcast channel can be a satellite channel or a terrestrial channel. The broadcast management server can be a server that generates and transmits broadcast signals and/or broadcast-related information, or a server that receives a previously-generated broadcast signal and/or previously-generated broadcast-related information and transmits the previously-generated broadcast signal and/or previously-generated broadcast-related information to the mobile terminal 100.

For example, the broadcast signal can be a TV broadcast signal, a radio broadcast signal, a data broadcast signal, the combination of a data broadcast signal and a TV broadcast signal or the combination of a data broadcast signal and a radio broadcast signal.

The broadcast-related information can include broadcast channel information, broadcast program information and/or broadcast service provider information. The broadcast-related information can be provided to the mobile terminal 100 through a mobile communication network. In such a case, the broadcast-related information can be received by the mobile communication module 113, rather than by the broadcast reception module 111.

The broadcast-related information can take various forms. For example, the broadcast-related information can have the form of an electronic program guide (EPG) of the digital multimedia broadcasting (DMB) standard, or an electronic service guide (ESG) of the digital video broadcast-handheld (DVB-H) standard.

The broadcast reception module 111 can be configured to receive the broadcast signal using various types of broadcasting systems, such as digital multimedia broadcasting-terrestrial (DMB-T), digital multimedia broadcasting-satellite (DMB-S), the data broadcasting system known as media forward link only (MediaFLO™), digital video broadcast-handheld (DVB-H), or integrated services digital broadcast-terrestrial (ISDB-T) systems. The broadcast reception module 111 is configured to be suitable for every broadcast system that provides a broadcast signal as well as the above-mentioned digital broadcast systems.

The broadcast signal and/or the broadcast-related information received via the broadcast reception module 111 can be stored in a storage medium, such as the memory 160.

The mobile communication module 113 transmits and/or receives wireless signals to and/or from at least a base station, an external terminal, or a server through a mobile communication network. Such wireless signals can include various types of data according to whether the mobile terminal 100 transmits or receives voice call signals, video call signals, text messages, or multimedia messages.

The wireless internet module 115 supports wireless Internet access for the mobile terminal 100. For example, the wireless internet module 115 can be embedded in the mobile terminal 100 or installed in an external device. The wireless Internet technology implemented by the wireless internet module 115 can be a wireless local area network (WLAN), Wi-Fi, Wireless Broadband (WiBro), World Interoperability for Microwave Access (WiMAX), or High Speed Downlink Packet Access (HSDPA).

The short-range communication module 117 is a module for supporting short-range communication. For example, the short-range communication module 117 can be configured to communicate using short range communication technology, such as Bluetooth™, radio frequency identification (RFID), Infrared Data Association (IrDA), Ultra-wideband (UWB), or ZigBee™.

The GPS module 119 can receive position information from a plurality of GPS satellites.

As shown in FIG. 1, the A/V input unit 120 can include an image capture device, such as a camera 121, and a device for detecting sounds, such as microphone 123. For example, the camera 121 can process image data of still pictures or video obtained via an image sensor of the camera 121 in a video telephony or photo capture mode of the mobile terminal 100. The processed image frames can be displayed on a visual output device, such as the display module 151.

The A/V input unit 120 can be used to receive audio signals or video signals. The image frames processed by the camera 121 can be stored in the memory 160, or transmitted via the wireless communication unit 110 to an external device. Other embodiments of the mobile terminal 100 can include more than one camera 121.

The microphone 123 can receive external sound signals during a call mode, a recording mode, or a voice recognition mode, and can convert the sound signals into electrical sound data. For example, when the mobile terminal 100 is in the call mode, the mobile communication module 113 can convert the electrical sound data into data for transmission to a mobile communication base station and output the data obtained by the conversion. The microphone 123 can include various types of noise canceling or suppression algorithms for removing any undesirable noise in the received external sound signals.

The user input unit 130 can be a user input device configured to generate input data based on inputs entered by a user to control various operations of the mobile terminal 100. For example, the user input unit 130 can include a keypad, a dome switch, a jog wheel, a jog switch, and/or a touch pad, such as a touch sensitive member that detects changes in resistance, pressure, voltage, or capacitance.

When the user input 130 is implemented as a touch pad and overlaid with the display module 151 in a layered manner, a "touch screen" may be formed allowing the display module 151 to function both as an input device and an output device.

The sensing unit 140 determines a current state of the mobile terminal 100, such as an opened or closed state, the relative positions of the components of the mobile terminal 100 and whether the mobile terminal 100 is placed in contact with a user. The mobile terminal 100 can generate a sensing signal based on the current state of the mobile terminal 100 for controlling the operation of the mobile terminal 100. For example, when the mobile terminal 100 is implemented as a slider-type mobile phone, the sensing unit 140 can be configured to determine whether the mobile terminal 100 is opened or closed. In addition, the sensing unit 140 can determine whether the power supply unit 190 supplies power and whether the interface unit 170 is connected to an external device.

The sensing unit 140 can include a proximity sensor 141, a pressure sensor 143 and a motion sensor 145. The proximity sensor 141 can determine the presence or absence of an object nearby and approaching the mobile terminal 100 without any physical contact with the object. More specifically, the proximity sensor 141 can determine the presence or absence of an object by detecting a change in an alternating magnetic field or the rate of change of static capacitance. The sensing unit 140 may include two or more proximity sensors 141.

The pressure sensor 143 can determine whether any pressure is being applied to the mobile terminal 100 or can measure the level of any pressure being applied to the mobile terminal 100. The pressure sensor 143 can be installed at a location in the mobile terminal 100 where the detection of pressure is desired. For example, the pressure sensor 143 can be installed in the display module 151. In such a case, a typical touch input can be differentiated from a pressure touch input using data provided by the pressure sensor 143, since a pressure touch input is generally applied with a greater level of pressure than a typical touch input. In addition, when a pressure touch input on the display module 151 is detected, it is possible to determine the level of pressure applied to the display module 151 upon the detection of a pressure touch input based on data provided by the pressure sensor 143.

The motion sensor 145 can determine the location and any motion of the mobile terminal 100 using an acceleration sensor or a gyro sensor.

An acceleration sensor is a device for detecting variations in acceleration and converting the variation into an electrical signal. With recent developments in micro-electromechanical system (MEMS) technology, acceleration sensors have been widely used in various products for various purposes. For example, an acceleration sensor can be installed in an airbag system in an automobile to detect a collision. Alternatively, an acceleration sensor can be used as an input device in a computer game controller and configured to sense the motion of the human hand during play of a computer game. In one embodiment, several acceleration sensors can be installed in the mobile terminal 100 to represent various axial directions. Alternatively, only one acceleration sensor representing a Z axis may be installed in the mobile terminal 100.

Gyro sensors are sensors for measuring angular velocity, and can determine the relative direction of rotation of the mobile terminal 100 with respect to a reference direction.

The output unit 150 can be configured to output audio signals, video signals and alarm signals. In one embodiment, the output unit 150 can include the display module 151, an audio output module 153, an alarm module 155, and a haptic module 157.

The display module 151 can display information processed by the mobile terminal 100. For example, when the mobile terminal 100 is in a call mode, the display module 151 can display a user interface (UI) or a graphic user interface (GUI)

for making or receiving a call. For example, if the mobile terminal 100 is in a video call mode or an image capturing mode, the display module 151 can display a UI or a GUI for capturing or receiving images.

When the display module 151 and the user input unit 130 form a layered structure and are thus implemented as a touch screen, the display module 151 can be used as an output device, as well as an input device. When the display module 151 is implemented as a touch screen, the display module 151 can also include a touch screen panel and a touch screen panel controller.

The touch screen panel, for example, can be a transparent panel attached to the exterior of the mobile terminal 100 and can be connected to an internal bus of the mobile terminal 100. The touch screen panel can detect whether the touch screen panel is being contacted by a user. Once a touch input to the touch screen panel is detected, the touch screen panel can transmit signals corresponding to the touch input to the touch screen panel controller. The touch screen panel controller can process the signals transmitted by the touch screen panel, and can transmit the processed signals to the controller 180. The controller 180 can determine whether a touch input has been generated and which part of the touch screen panel has been touched based on the processed signals transmitted by the touch screen panel controller.

In one embodiment, the display module 151 can include electronic paper (e-paper). E-paper is a type of reflective display technology that can achieve a high resolution, wide viewing angles and can maintain a displayed image even after power is no longer supplied. E-paper can be implemented on any type of substrate, such as plastic, metallic or paper. In addition, e-paper can reduce the power consumption of the mobile terminal 100, because it does not require a backlight assembly. The display module 151 may be implemented as e-paper by using electrostatic-charged hemispherical twist balls, electrophoretic deposition, or microcapsules.

The display module 151 can include at least a liquid crystal display (LCD), a thin film transistor (TFT)-LCD, an organic light-emitting diode (OLED), a flexible display, or a three-dimensional (3D) display. In one embodiment, the mobile terminal 100 can include two or more display modules 151. For example, the mobile terminal 100 can include an external display module (not shown) and an internal display module (not shown).

The audio output module 153 can output audio data received by the wireless communication unit 110 during a call reception mode, a call mode, a recording mode, a voice recognition mode, or a broadcast reception mode or can output audio data stored in the memory 160. In addition, the audio output module 153 can output various sound signals associated with the functions of the mobile terminal 100, such as receiving a call or a message. The audio output module 153 can include, for example, a speaker and a buzzer.

The alarm module 155 can output an alarm signal indicating the occurrence of an event in the mobile terminal 100, such as receiving a call signal, receiving a message, or receiving a key signal. The alarm signal can be, for example, an audio signal, a video signal, and/or a vibration signal. For example, the alarm module 155 can output an alarm signal upon receiving a call signal or a message. In addition, the alarm module 155 can receive a key signal and output an alarm signal as feedback to the key signal. Once an alarm signal is output by the alarm module 155, the user can be notified that an event has occurred. An alarm signal for notifying the user of the occurrence of an event can also be output by the display module 151 or the audio output module 153.

The haptic module 157 can provide various haptic effects (such as vibrations) that can be detected by the user. When the haptic module 157 generates vibrations, the intensity and the pattern of the vibrations can be altered. The haptic module 157 can synthesize different vibration effects and can output the result. Alternatively, the haptic module 157 can sequentially output different vibration effects.

The haptic module 157 can provide various haptic effects other than vibrations, such as a stimulation caused by an array of vertically moving pins that are in contact with the skin of the user, a stimulation caused by a discharge or suction of air through a discharge hole or a suction hole, a stimulation involving an application of a stimulus to the surface of the user's skin, a stimulation caused by contact with an electrode, a stimulation caused by an electrostatic force, and a stimulation caused by the application of cold and warm temperatures using an element capable of absorbing or radiating heat.

The haptic module 157 can enable a user to feel haptic effects via a kinesthetic sense of her fingers or arms. For example, the mobile terminal 100 can include at least two haptic modules 157.

The memory 160 can store various programs that are used for the processing and operations performed by the controller 180. In addition, the memory 160 can store various data such as a phonebook, messages, still images, or moving images.

For example, the memory 160 can include at least one type of storage medium, such as a flash memory, a hard disk, a multimedia card, a micro type memory, a card type memory, such as a secure digital (SD) card or extreme digital (XD) card, a random access memory (RAM), or a read-only memory (ROM). In other embodiments, the memory 160 can be a network storage device that can be accessed by the mobile terminal 100 via a network, such as the Internet.

The interface unit 170 can interface with an external device that can be connected to the mobile terminal 100. For example, the interface unit 170 can be a wired/wireless headset, an external battery charger, a wired/wireless data port, a card socket for a memory card, a subscriber identification module (SIM)/user identity module (UIM) card, an audio input/output (I/O) terminal, a video I/O terminal, or an earphone. The interface unit 170 can receive data from an external device or can be used to receive power from an external device. The interface unit 170 can transmit data provided by an external device to other components in the mobile terminal 100 or can transmit data provided by other components in the mobile terminal 100 to an external device.

When the mobile terminal 100 is connected to an external cradle (not shown in FIG. 1), power can be supplied from the external cradle to the mobile terminal 100 through the interface unit 170. In addition, various command signals can be transmitted from the external cradle to the mobile terminal 100 through the interface unit 170.

The controller 180 can control the general operations of the mobile terminal 100. For example, the controller 180 can perform various control operations related to making and receiving a voice call, transmitting and receiving data, or making and receiving a video call.

The controller 180 can include a multimedia module 181 for reproducing or playing back multimedia data. In one embodiment, the multimedia module 181 can be implemented as a hardware device and can be installed in the controller 180. In another embodiment, the multimedia module 181 can be implemented as a software program.

The power supply unit 190 can be an external power source or an internal power source and supplies power to other components in the mobile terminal 100.

The mobile terminal 100 can include a wired/wireless communication system and a satellite-based communication system. The mobile terminal 100 can be configured to operate in a communication system transmitting data as frames or packets.

In one embodiment, the mobile terminal 100 can be a slider-type mobile phone. However, in other embodiments, the present invention can be applied to various other types of mobile phones.

Figure 2:
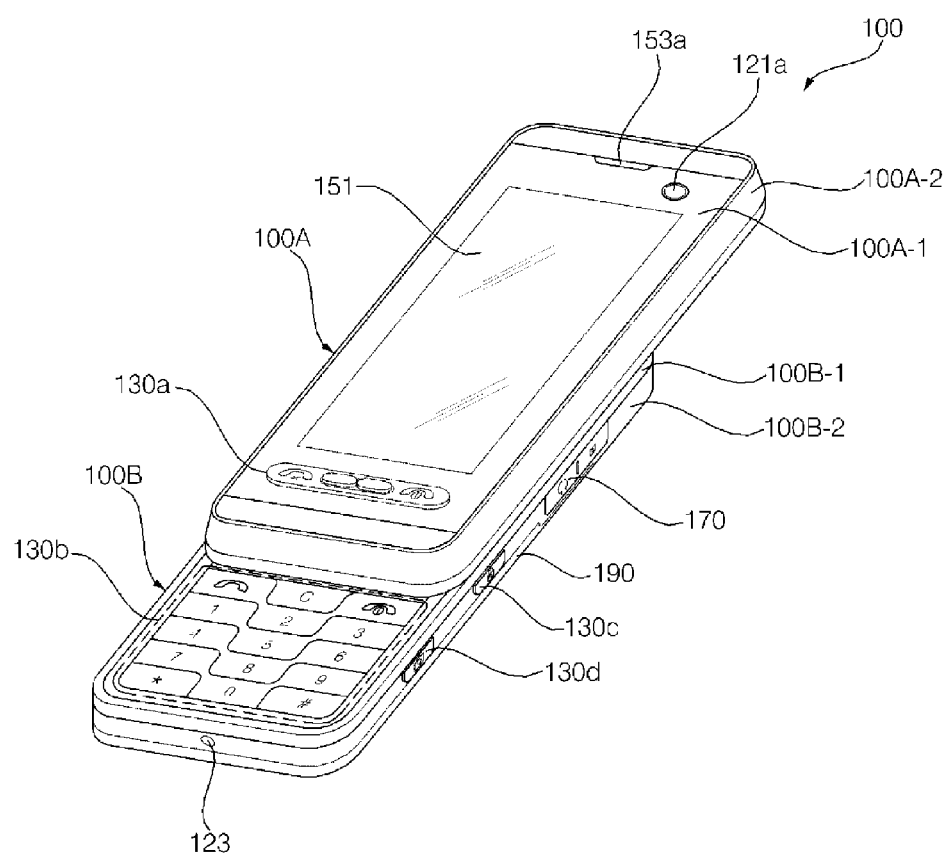
FIG. 2 illustrates a front perspective view of the mobile terminal in accordance with various embodiments of the invention.

FIG. 2 illustrates a front perspective view of the mobile terminal 100 in accordance with various embodiments of the invention.

As shown in FIG. 2, the mobile terminal 100 includes a first body 100A and a second body 100B, where the second body 100B is configured to slide relative to the first body 100A.

When the first body 100A and the second body 100B completely overlap each other, the mobile terminal 100 is referred to as being in the closed configuration. On the other hand, as shown in FIG. 2, when the first body 100A slides relative to the second body 100B, such that a portion of the second body 100B is partially exposed, the mobile terminal 100 is referred to as being in the open configuration.

When the mobile terminal 100 is in the closed configuration, the mobile terminal 100 can generally operate in a standby mode and can be released from the standby mode in response to user manipulation. On the other hand, when the mobile terminal 100 is in the open configuration, the mobile terminal 100 can generally operate in a call mode and can be switched to the standby mode either manually in response to a user manipulation or automatically after the lapse of a predefined period of time.

As shown in FIG. 2, the exterior of the first body 100A includes a first front case 100A-1 and a first rear case 100A-2. Various electronic components can be installed in the space (not shown in FIG. 2) between the first front case 100A-1 and the first rear case 100A-2. At least one intermediate case can be additionally disposed between the first front case 100A-1 and the first rear case 100A-2.

For example, the first front case 100A-1 and the first rear case 100A-2 can be formed by injection molding of a synthetic resin. Alternatively, the first front case 100A-1 and the first rear case 100A-2 can be formed of a metal, such as stainless steel (STS) or titanium (Ti).

As shown in FIG. 2, a display module 151, a first audio output module 153a, a first camera 121a, and a first user input unit 130a are disposed on the first front case 100A-1. The display module 151 can be, for example, an LCD or an OLED.

In one embodiment, the display module 151 can be configured as a touch screen by incorporating the user input unit 130 in a layered manner. Therefore, a user can use the display module 151 to input information by touching the display module 151.

As shown in FIG. 2, the exterior of the second body 100B includes a second front case 100B-1 and a second rear case 100B-2. A second user input unit 130b can be disposed on the second body 100B. For example, the second user input 130b can be disposed at the front of the second front case 100B-1. A third user input unit 130c, a fourth user input unit 130d, the microphone 123 and the interface unit 170 can be located on the second front case 100B-1 or the second rear case 100B-2.

The first through fourth user input units 130a through 130d, a fifth user input unit 130e, and a sixth user input unit 130f can be collectively referred to as the user input unit 130. The user input unit 130 can utilize various manipulation methods which offer a tactile feedback to the user.

The user input unit 130a can allow a user to input such commands as "start," "end," and "scroll" to the mobile terminal 100. The second user input unit 130b can allow a user to input various numerals, characters or symbols. The third and fourth user input units 130c and 130d can be used as hot keys for activating certain functions of the mobile terminal 100. The user input unit 130 can also allow a user to choose an operating mode and can serve as a hot key for activating certain functions of the mobile terminal 100.

The microphone 123 can be configured to receive the user's voice or other sounds.

Figure 3:
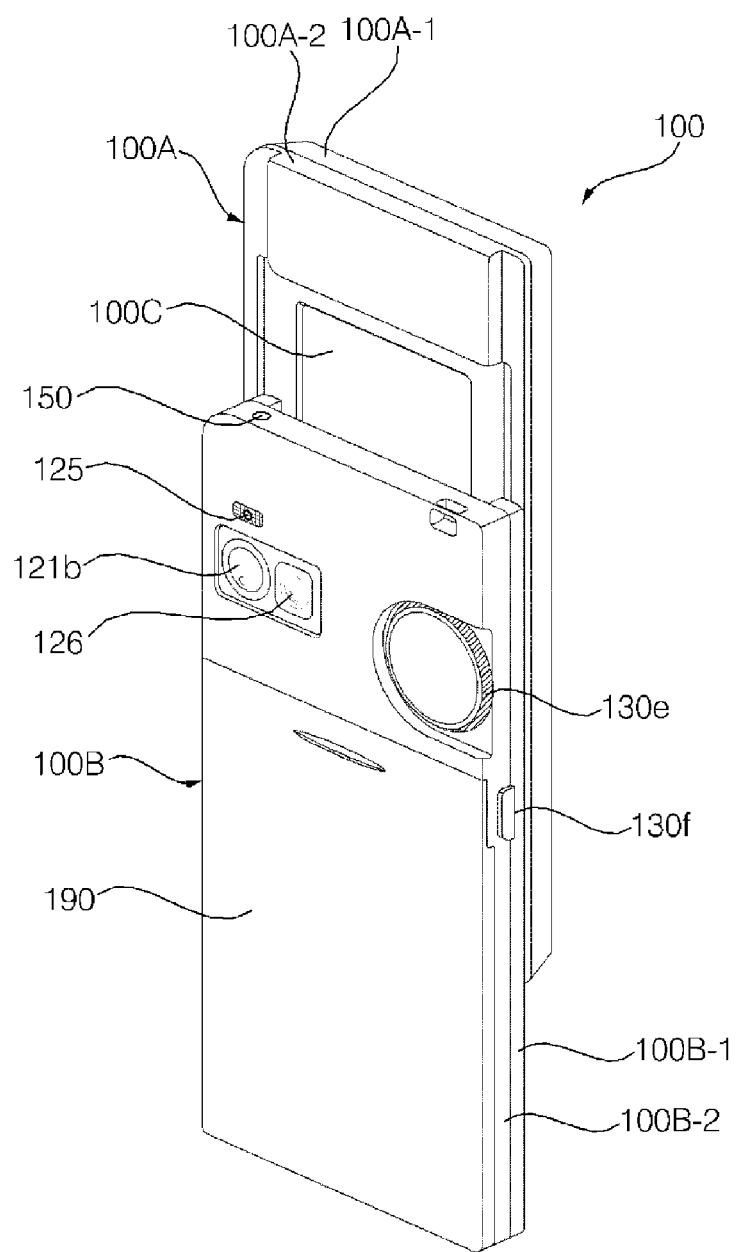
FIG. 3 illustrates a rear perspective view of the mobile terminal in accordance with various embodiments of the invention.

FIG. 3 illustrates a rear perspective view of the mobile terminal 100 in accordance with various embodiments of the invention. As shown in FIG. 3, the fifth user input unit 130e, which is implemented as a wheel type input, and the second camera 121b can be disposed at the rear of the second rear case 100B-2 of the second body 100B, and a sixth user input unit 130f can be disposed on one side of the second body 100B.

The second camera 121b shown in FIG. 3 can have a direction of view that is different from the direction of view of the first camera 121a shown in FIG. 2. In one embodiment, the first camera 121a can be rotatably coupled to the front case 100A-1 and can achieve the direction of view of the second camera 121b. In such an embodiment, the second camera 121b can be optional.

The first and second cameras 121a and 121b can be configured to have different resolutions. In one embodiment, the first camera 121a can be configured to operate with a relatively lower resolution than the second camera 121b. For example, the first camera 121a can be used to capture an image of the user to allow immediate transmission of the image during a video call and the second camera 121b can be used to capture images of general objects with high picture quality, which may not require immediate transmission in real-time, but may be stored for later viewing or use.

Additional camera related components, such as camera flash 125 and a mirror 126 can be disposed near the second camera 121b. The mirror 126 allows self-image capturing by allowing the user to see himself when the user desires to capture his own image using the camera 121b. The camera flash 125 can illuminate a subject when the second camera 121b captures an image of the subject.

A second audio output module (not shown in FIG. 3) can be additionally provided in the second rear case 100B-2. The second audio output module can support a stereo function along with the first audio output module 153a. The second audio output module can also be used during a speaker-phone mode.

An antenna (not shown) for receiving a broadcast signal can be disposed on one side of the second rear case 100B-2. The antenna can be extended and retracted from the second rear case 100B-2.

As shown in FIG. 3, a slide module 100C can be partially exposed on the first rear case 100A-2 of the first body 100A. The slide module 100C can be configured to couple the first body 100A and the second body 100B, such that the first body 100A and the second body 100B are allowed to slide up and down relative to one another. A portion of the slide module 100C may be hidden from view by the second front case 100B-1 of the second body 100B and, therefore, may not be exposed.

The second camera 121b and the other elements that have been described as being provided on the first rear case 100A-2 can be disposed on the first front case 100A-1.

The power supply unit 190 can be disposed in the first rear case 100A-2. The power supply unit 190 can be a rechargeable battery and can be detachably coupled to the first rear case 100A-2.

Figure 4:
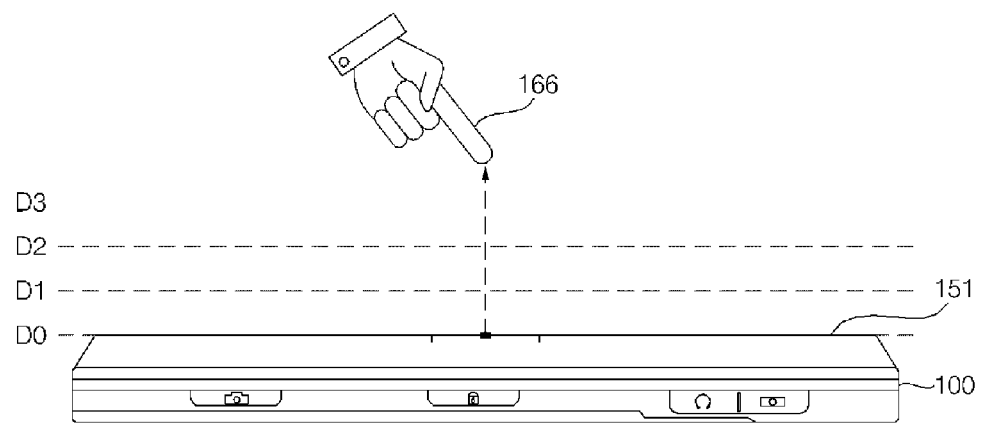
FIG. 4 illustrates a diagram for explaining how to generate a proximity touch input in accordance with various embodiments of the invention.

FIG. 4 illustrates a diagram for explaining how to generate a proximity touch input in accordance with various embodiments of the invention.

As shown in FIG. 4, when a pointer 166, such as a user's finger or stylus, approaches the display module 151, the proximity sensor 141 located inside or near the display module 151 can detect the pointer 166 and provide a proximity signal. For example, the proximity sensor 141 can be configured to output a proximity signal indicating the distance between the pointer 166 and the display module 151. Such a distance is also referred to in the art as a "proximity depth."

The distance at which the proximity signal is provided by the proximity sensor 141 when the pointer 166 approaches the display module 151 is referred to as a detection distance. For example, the proximity depth can be determined by using a number of proximity sensors installed in the mobile terminal 100, such as proximity sensor 141, having various detection distances and by comparing the proximity signals provided by each corresponding proximity sensor.

In addition, it may be determined what part of the display module 151 is being approached by the pointer 166 and whether the pointer 166 is being moved within the proximity of the display module 151 by determining which of the number of proximity sensors 141 is providing a proximity signal. Then, the controller 180 can control the haptic module 157 to generate a haptic-effect signal corresponding to a touch key that is currently being approached by the pointer 166.

The exemplary mobile terminal 100 shown in FIG. 4 is configured to detect three proximity depths, such as proximity depths D1, D2, and D3, where each proximity depth represents the distance from the display module 151 to a location above the display module 151 in a substantially perpendicular direction above the display module 151. The relationships between the proximity depths D0, D1, D2, and D3 can be expressed as: $D0<D1<D2<D3$. It should be understood that in other embodiments, the mobile terminal 100 can be configured to include less than or greater than three proximity sensors to enable detection of any number of proximity depths.

For example, when the pointer 166 comes into contact with the display module 151, the proximity depth D0 is detected and it is recognized as a typical touch input; when the pointer 166 is located within the proximity depth D1 and the proximity depth D0, a proximity touch input at the proximity depth D1 is recognized; when the pointer 166 is located between the proximity depth D1 and the proximity depth D2, a proximity touch input at the proximity depth D2 is recognized; when the pointer 166 is located within the proximity depth D2 and the proximity depth D3, a proximity touch input at the proximity depth D3 is recognized; when the pointer 166 is located at a distance greater than the proximity depth D3, no proximity touch is recognized.

Figure 5A:
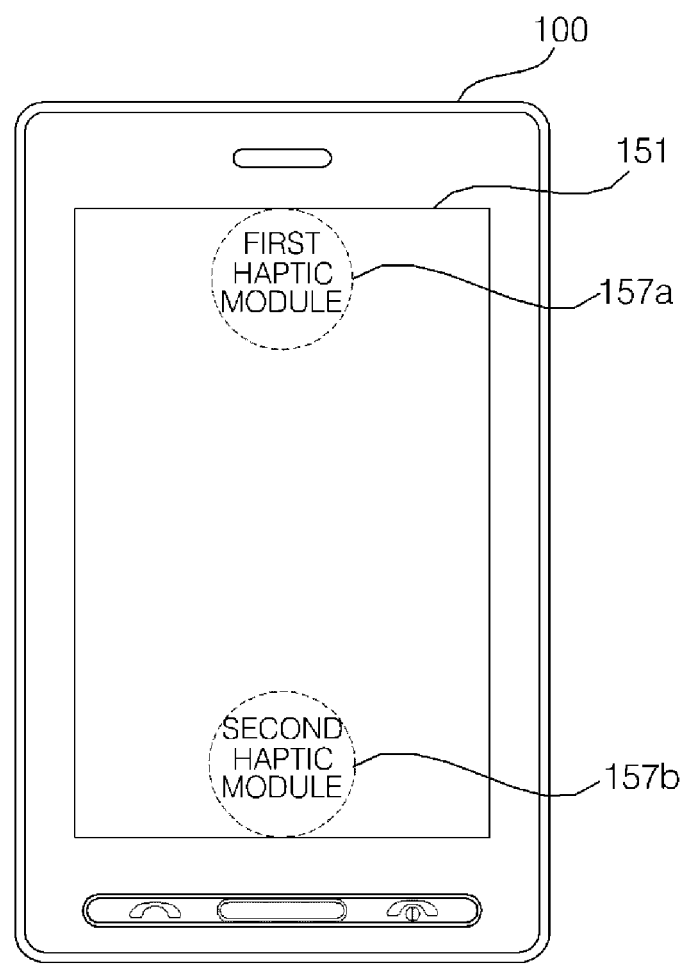
FIGS. 5A and 5B illustrate exemplary arrangements of haptic modules in the mobile terminal in accordance with various embodiments of the invention.
Figure 5B:
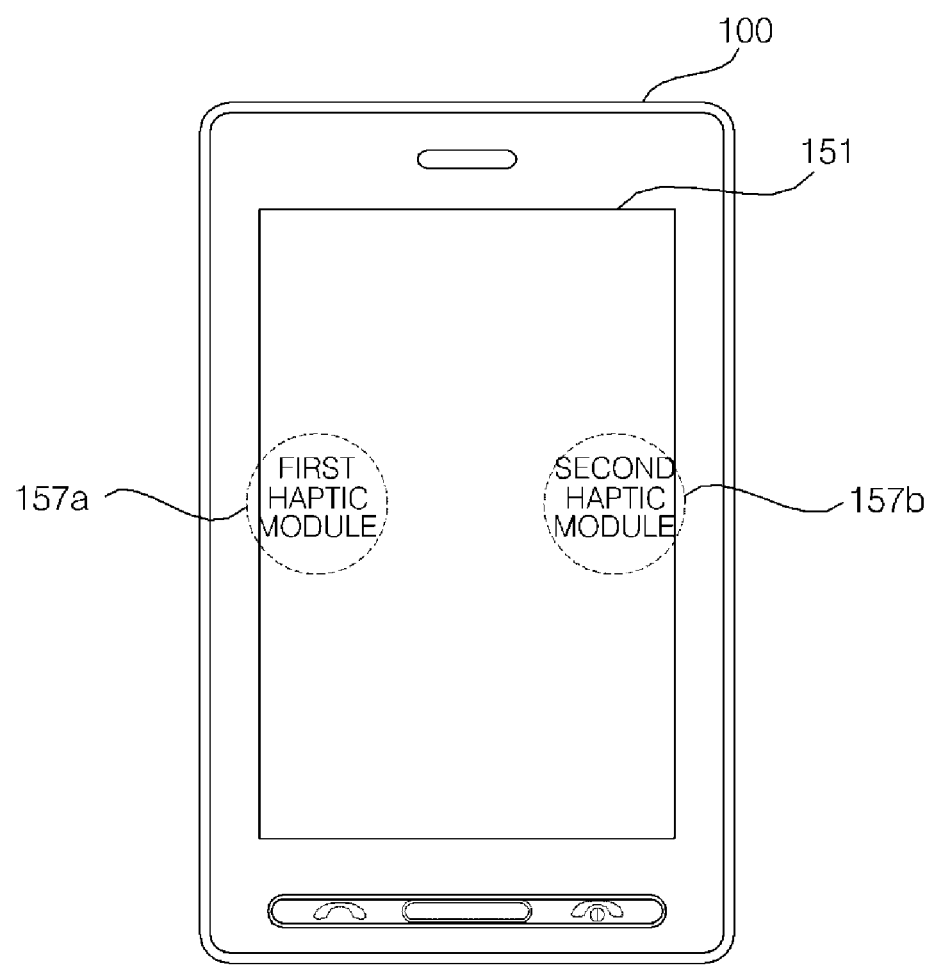

FIGS. 5A and 5B illustrate exemplary arrangements of haptic modules in the mobile terminal 100 in accordance with various embodiments of the invention. For example, as shown in FIGS. 5A and 5B, the mobile terminal 100 can include a plurality of haptic modules, such as first haptic module 157a and second haptic module 157b.

As shown in FIG. 5A, for example, the first and second haptic modules 157a and 157b can be disposed at upper and lower sides of the display module 151. Alternatively, referring to FIG. 5B, the first and second haptic modules 157a and 157b can be disposed at left and right sides of the display module 151. It should be understood that the arrangement of the haptic modules 157 shown in FIGS. 5A and 5B are merely illustrative and that various other arrangements of the haptic modules 157 can be achieved. For example, the mobile terminal 100 can include three or more haptic modules 157 disposed at the upper and lower sides of the display module 151 and at the left and right sides of the display module 151.

The haptic modules 157, such as haptic modules 157a and 157b, can concurrently generate various haptic effects having different patterns, intensities or speeds. Alternatively, the mobile terminal 100 can be configured utilize only one haptic module 157 to concurrently generate various haptic effects.

Figure 6:
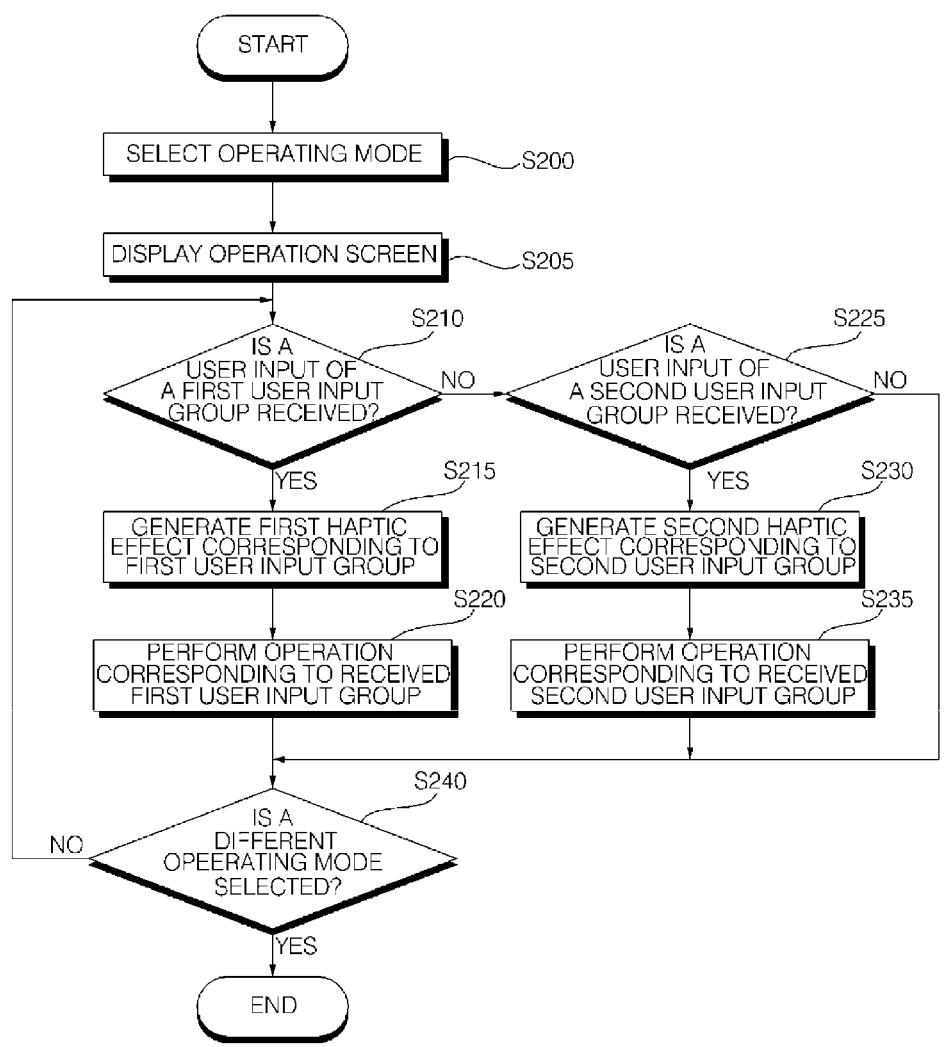
FIG. 6 is a flowchart illustrating a method of controlling a mobile terminal in accordance with various embodiments of the invention.

FIG. 6 is a flowchart illustrating a method of controlling a mobile terminal in accordance with various embodiments of the invention. As shown in FIG. 6, an operating mode, such as a camera mode, a multimedia file play mode, or a broadcast-viewer mode is selected by the controller 180 (S200). For example, the operating mode can be selected in response to a user command. The controller 180 then displays an operation screen corresponding to the selected operating mode on the display module 151 (S205).

The controller 180 determines whether a user input of a first user input group is received (S210). If a user input belonging to a first user input group is received (S210), the controller 180 controls the first haptic module 157a to generate a first haptic effect corresponding to the first user input group (S215) and performs an operation corresponding to the first user input group (S220).

On the other hand, if the user input does not belong to the first user input group (S210), the controller 180 determines whether a user input of a second user input group (S225) is received. If a user input belonging to a second user input group is received (S225), the controller 180 controls the second haptic module 157b to generate a second haptic effect corresponding to the second user input group (S230) and performs an operation corresponding to the second user input group (S235). If the user input does not belong to the second user input group (S225), the controller 180 determines whether a different operating mode is selected (S240).

If a different operating mode is selected (S240), the method ends. However, if a different operating mode is not selected (S240), the controller determines whether a user input of first user input group is received (S210). Accordingly, operations S210 through S235 can be repeatedly performed until a different operating mode of the mobile terminal 100 is selected.

The first and second user input groups can vary according to the type of operating mode or user settings. For example, a user input for selecting a vowel can belong to the first user input group, and a user input for selecting a consonant can belong to the second user input group. Alternatively, a user input for selecting a lower case letter can belong to the first user input group and a user input for selecting a capital letter can belong to the second user input group. As another example, a user input can belong to one of the first and second user input groups according to the location of a letter that can be selected by the user input.

The first and second haptic effects can be generated at different locations of the mobile terminal 100. In addition, the first and second haptic effects can have different patterns or intensities. The controller 180 can control the first and second haptic modules 157a and 157b to generate a third haptic effect for a certain type of event, where the third haptic effect can be a combination of the first and second haptic effects.

In this manner, it is possible to generate different haptic effects for different types of user inputs.

Figure 7:
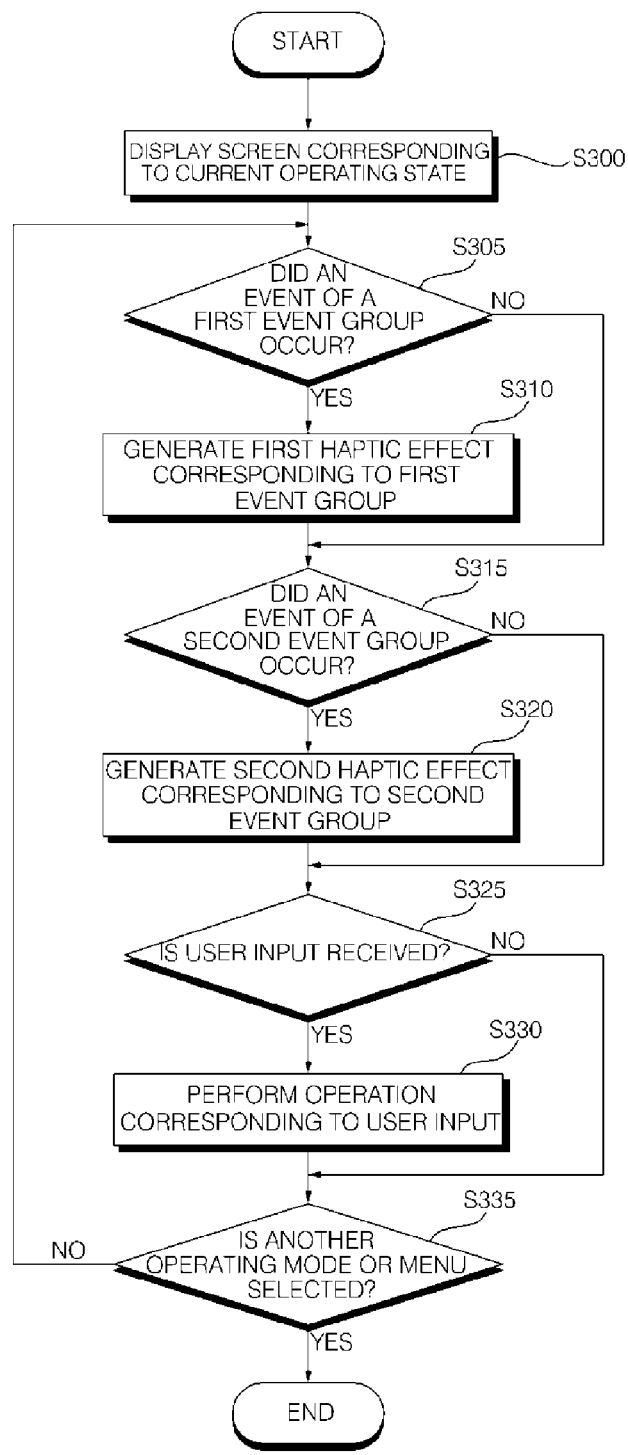
FIG. 7 is a flowchart illustrating a method of controlling a mobile terminal in accordance with various embodiments of the invention.

FIG. 7 is a flowchart illustrating a method of controlling a mobile terminal in accordance with various embodiments of the invention. Referring to FIG. 7, the controller 180 displays an operation screen corresponding to a current menu or operation selected by the user on the display module 151 (S300). Examples of the operation screen include an idle screen, a still/moving image-viewer screen, a list screen, a broadcast screen, a map screen and a webpage screen.

The controller 180 then determines whether an event of a first event group has occurred (S305). If an event belonging to a first event group has occurred (S305), the controller 180 controls the first haptic module 157a to generate a first haptic effect corresponding to the first event group (S310). On the other hand, if an event belonging to a first event group has not occurred (S305), the controller determines whether an event of a second event group has occurred (S315).

If an event belonging to the second event group has occurred (S315), the controller 180 controls the second haptic module 157b to generate a second haptic effect corresponding to the second event group (S320). If an event belonging to the second event group has not occurred (S315), the controller 180 determines whether a user input, such as a touch input, has been received (S325). If a user input has been received (S325), the controller 180 performs an operation corresponding to the user input (S330). If a user input has not been received (S325), the controller 180 then determines whether another operating mode or menu has been selected (S335).

If another operating mode or menu has been selected (S335), the method ends. If another operating mode or menu has been selected (S335), the controller 180 determines whether an event belonging to a first event group has occurred (S305). Accordingly, operations S305 through 5330 can be repeatedly performed until a different operating mode or menu is selected (S335).

The first and second event groups can vary according to the types of operating modes or user settings. For example, an event that includes receiving a voice call can belong to the first event group and an event that includes receiving a video call can belong to the second event group. Alternatively, an event that includes receiving a short message service (SMS) message can belong to the first event group, and an event that includes receiving a multimedia messaging service (MMS) message can belong to the second event group.

The controller 180 can control the first and second haptic modules 157a and 157b to generate a third haptic effect, where the third haptic effect can be a combination of the first and second haptic effects, for a certain type of event. In this manner, it is possible to generate different haptic effects for different types of events.

The methods described above with respect to FIGS. 6 and 7 will be described in further detail with reference to FIGS. 8 through 22. For convenience, it is assumed that the mobile terminal 100 generates a vibration as a haptic effect. However, it should be understood that the mobile terminal 100 can be configured to generate haptic effects other than a vibration.

FIGS. 8 through 18 are exemplary diagrams of the mobile terminal 100 performing the method described with respect to FIG. 6.

Figure 8A:
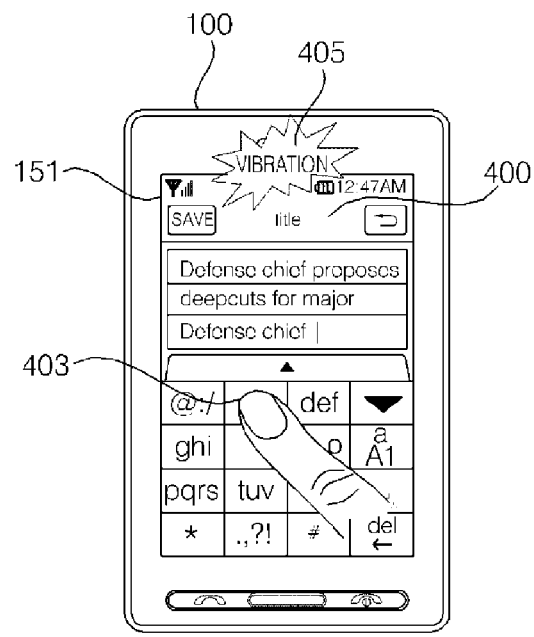
FIG. 8A illustrates an exemplary character-input screen displayed on the display module of the mobile terminal in accordance with various embodiments of the invention.

FIG. 8A illustrates an exemplary character-input screen 400 displayed on the display module 151 in accordance with various embodiments of the invention. For example, with reference to FIG. 8A, if a typical touch input or proximity-touch input 403 for selecting a consonant letter is detected when the character input screen 400 is displayed, the first haptic module 157a disposed on the upper side of the display module 151 can generate a haptic effect. For example, a vibration 405 can be generated at the top of the character input screen 400.

Figure 8B:
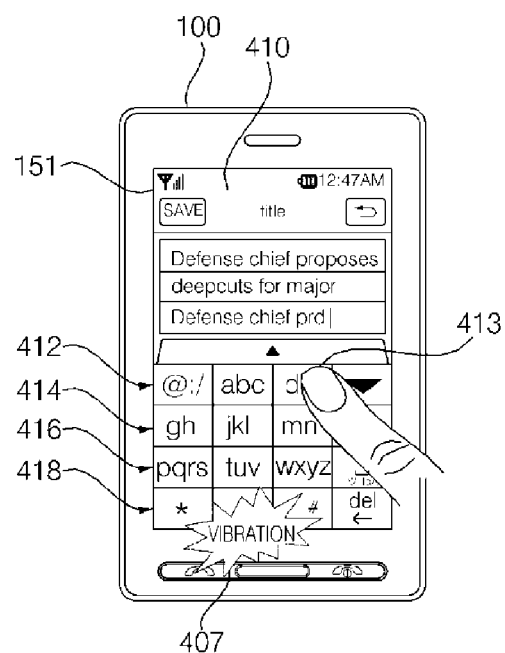
FIG. 8B illustrates an exemplary character-input screen displayed on the display module of the mobile terminal in accordance with various embodiments of the invention.

FIG. 8B illustrates an exemplary character-input screen 410 displayed on the display module 151 in accordance with various embodiments of the invention. For example, with reference to FIG. 8B, if a typical touch input or proximity-touch input 413 for selecting a vowel is detected when the character-input screen 410 is displayed, the second haptic module 157b disposed on the lower side of the display module 151 can generate a haptic effect. For example, a vibration 407 can be generated at the bottom of the character input screen 400.

Therefore, different haptic effects can be generated by the mobile terminal 100 depending on whether a consonant has been input or whether a vowel has been input. In addition, different haptic effects can be generated by the mobile terminal 100 depending on whether a lower case letter has been input or whether a capital letter has been input and different haptic effects can be generated by the mobile terminal 100 depending on whether a symbol has been input or whether an emoticon has been input.

Moreover, a haptic effect can be generated at different locations on the mobile terminal 100 for different rows of touch keys. For example, with reference to FIG. 8B, if a touch key in a first row 412 or a second row 414 of a touch keypad is selected by a user, a haptic effect can be generated at the top of the character-input screen 410 of the display module 151. On the other hand, if a touch key in a third row 416 or fourth row 418 of the touch keypad is selected by a user, a haptic effect can be generated at the bottom of the character-input screen 410 of the display module 151.

Figure 9A:
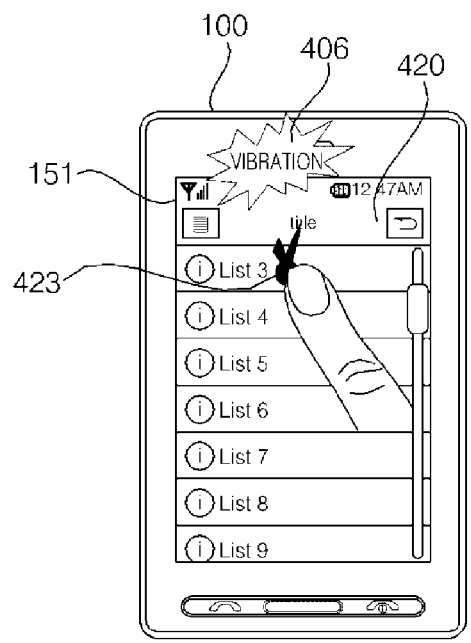
FIGS. 9A and 9B illustrate exemplary list screens displayed on the display module of the mobile terminal in accordance with various embodiments of the invention.
Figure 9B:
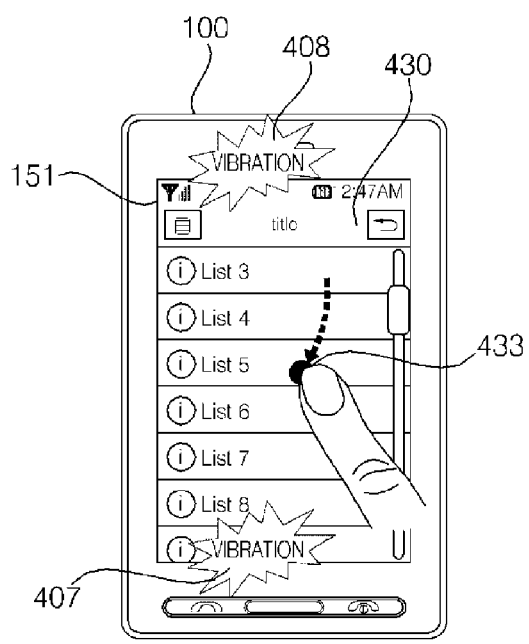

FIGS. 9A and 9B illustrate exemplary list screens displayed on the display module 151 in accordance with various embodiments of the invention. For example, with reference to FIG. 9A, if one of the listed items displayed on the list screen 420 is selected in response to a user input 423, a first haptic effect, such as the vibration 406, can be generated at the top of the list screen 420. For example, with reference to FIG. 9B, if a list of items displayed on the list screen 430 is scrolled through in response to a drag input 433, a second haptic effect, such as the vibration 408, can be generated for a short time at the bottom of the list screen 430.

In one embodiment, if the items displayed on the list screen 430 are scrolled through to the extent that the top or the bottom of the list is encountered, a haptic effect that is a combination of the first and second haptic effects can be generated. Various haptic effects can also be generated in response to a flicking operation performed on the list screen 420 or 430.

Figure 10A:
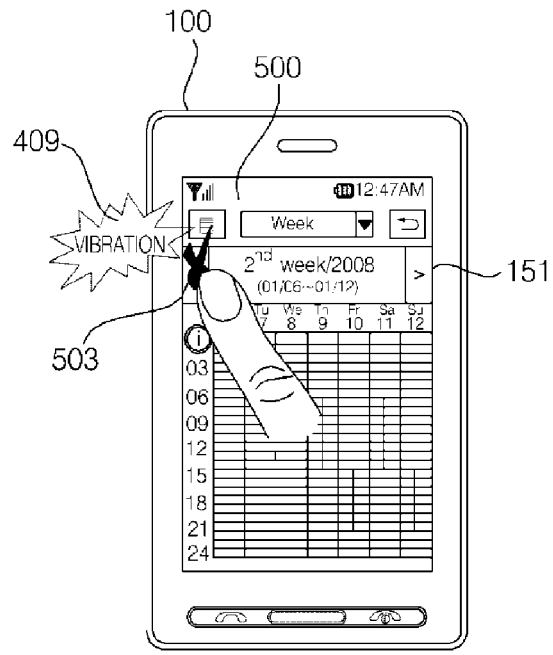
FIGS. 10A and 10B illustrate exemplary screens for performing cell control displayed on the display module of the mobile terminal in accordance with various embodiments of the invention.
Figure 10B:
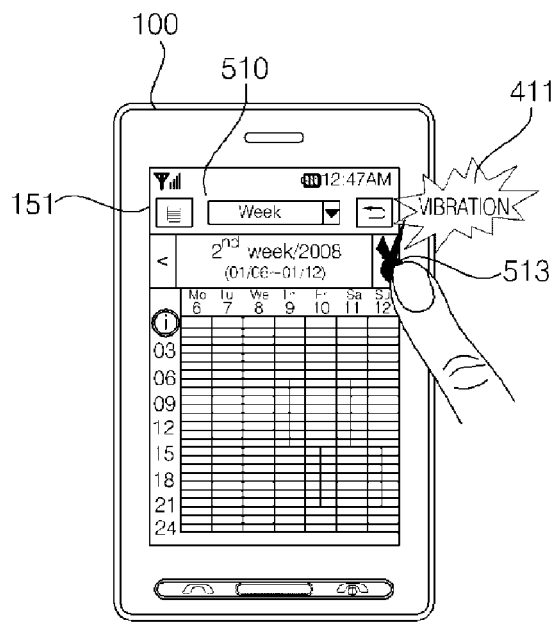

FIGS. 10A and 10B illustrate exemplary screens for performing cell control displayed on the display module 151 in accordance with various embodiments of the invention. For example, with reference to FIG. 10A, if a user input 503 for selecting a previous item is received when the screen 500 is displayed, then a haptic effect, such as a vibration 409, can be generated on the left side of the screen 500. On the other hand, with reference to FIG. 10B, if a user input 513 for selecting a subsequent item is received when the screen 510 is displayed, then a haptic effect, such as a vibration 411, can be generated on the right side of the screen 510.

Figure 11A:
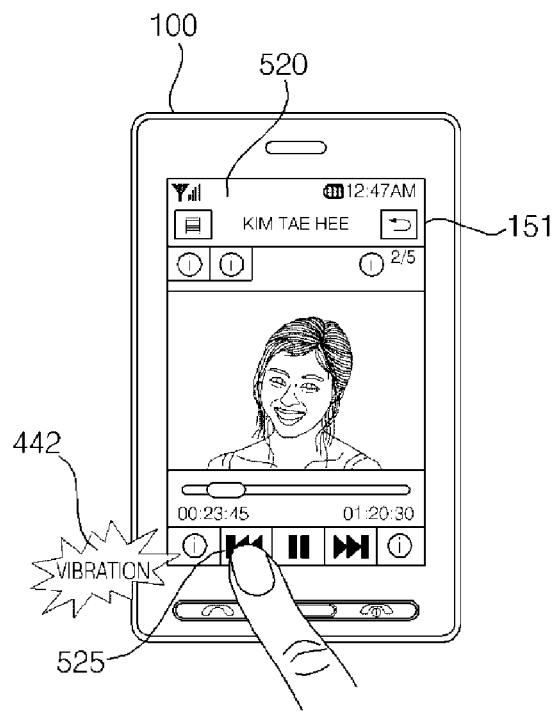
FIGS. 11A and 11B illustrate exemplary screens for playing an MP3 file or a moving image file in accordance with various embodiments of the invention.
Figure 11B:
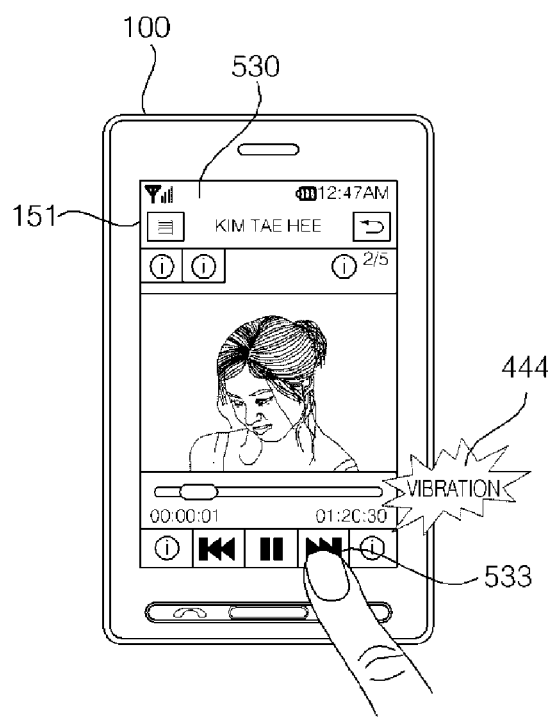

FIGS. 11A and 11B illustrate exemplary screens for playing an MP3 file or a moving image file in accordance with various embodiments of the invention. For example, with reference to FIG. 11A, if a user input 525 for rewinding a moving image file currently being played is received when the screen 520 is displayed, then a haptic effect, such as a vibration 442, can be generated on the left side of the screen 520. On the other hand, with reference to FIG. 11B, if a user input 533 for fast-forwarding a moving image file currently being played is received when the screen 530 is displayed, then a haptic effect, such as a vibration 444, can be generated on the right side of the screen 530.

For example, if a sectional repeat function is set, a haptic effect can be generated on the left side of the screen of the display module 151 at the beginning of the execution of the sectional repeat function, and a haptic effect can be generated on the right side of the screen of the display module 151 at the end of the execution of the sectional repeat function.

Figure 12A:
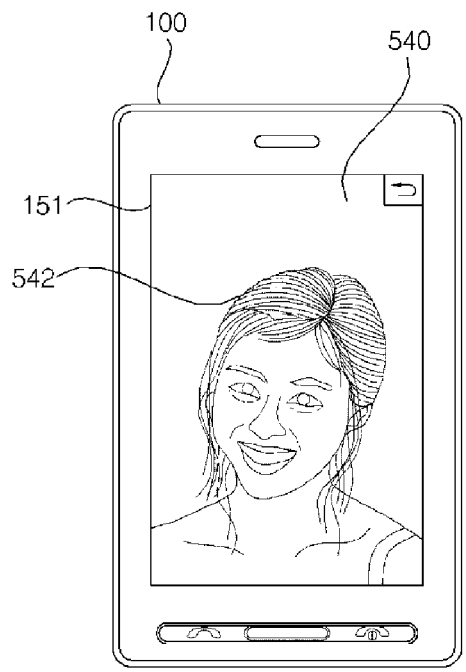
FIGS. 12A and 12B illustrate exemplary image viewer screens displayed on the display module of the mobile terminal in accordance with various embodiments of the invention.
Figure 12B:
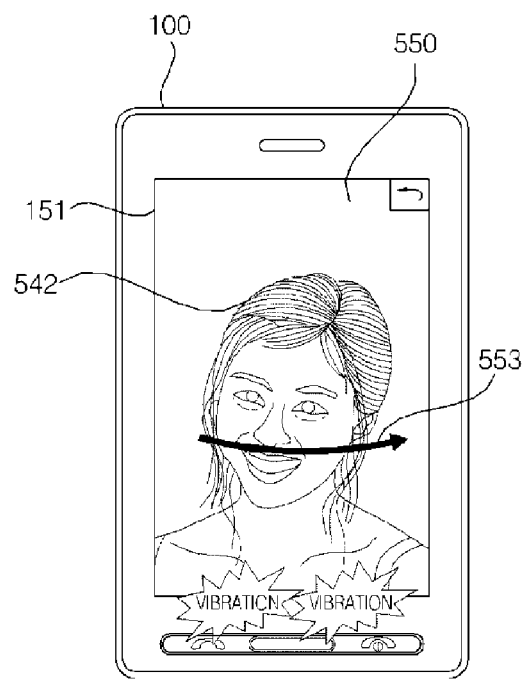

FIGS. 12A and 12B illustrate exemplary image viewer screens displayed on the display module 151 in accordance with various embodiments of the invention. For example, with reference to FIG. 12A, an image 542 selected by the user can be displayed on the image viewer screen 540. With reference to FIG. 12B, if the image 542 displayed on the image viewer screen 550 is flicked or dragged, as indicated by reference numeral 553, a complex haptic effect can be generated by combining a plurality of haptic effects in consideration of the speed and direction of the flicking or dragging of the image 542.

If another image is selected, a complex haptic effect can also be generated by combining a plurality of haptic effects in order to alert the user. If a predetermined image is encountered during, for example, a slideshow, a complex haptic effect can also be generated by combining a plurality of haptic effects in order to alert the user.

As a further example, the dragging user input may include a velocity, such that responsive to dragging user input, a haptic feedback may be generated. This haptic feedback may occur at a plurality of locations and have an intensity which corresponds to the velocity of the dragging user input (e.g., increased velocity provides increased intensity and vice versa). Alternatively, the dragging user input may include a direction at which the input generally follows, such that responsive to the dragging user input, a haptic feedback may be generated. This haptic feedback may occur at a plurality of locations in a staggered manner that generally reflects the direction of the dragging user input (e.g., from left to right or bottom to top).

Figure 13A:
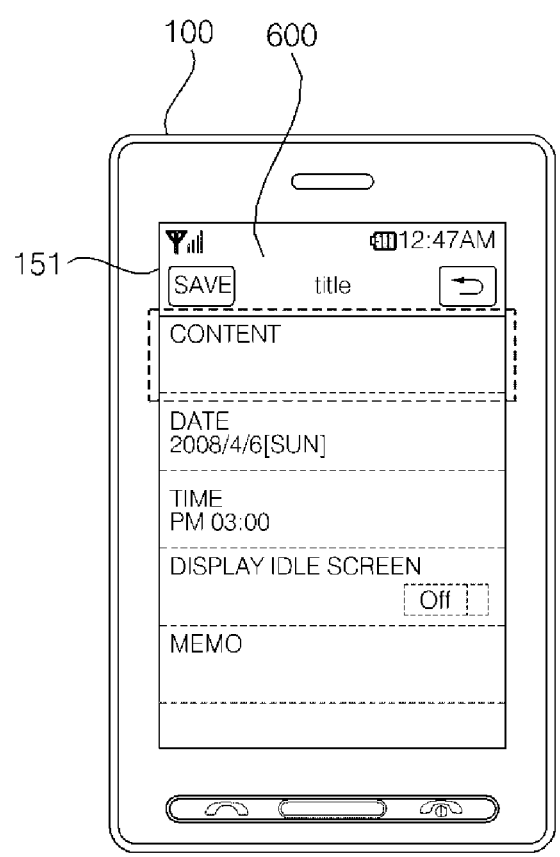
FIGS. 13A through 13C illustrate exemplary editor screens displayed on the display module of the mobile terminal in accordance with various embodiments of the invention.
Figure 13B:
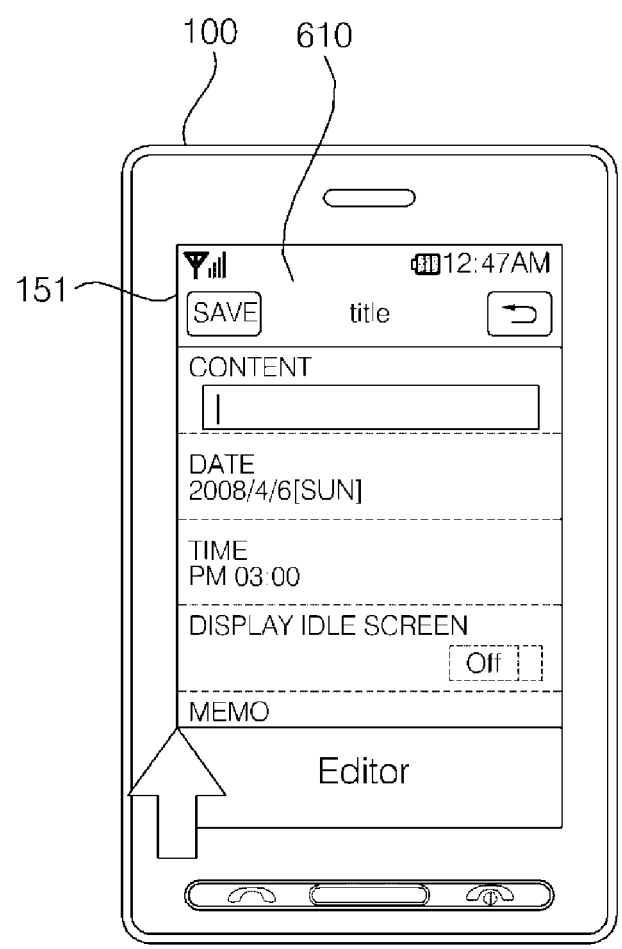
Figure 13C:
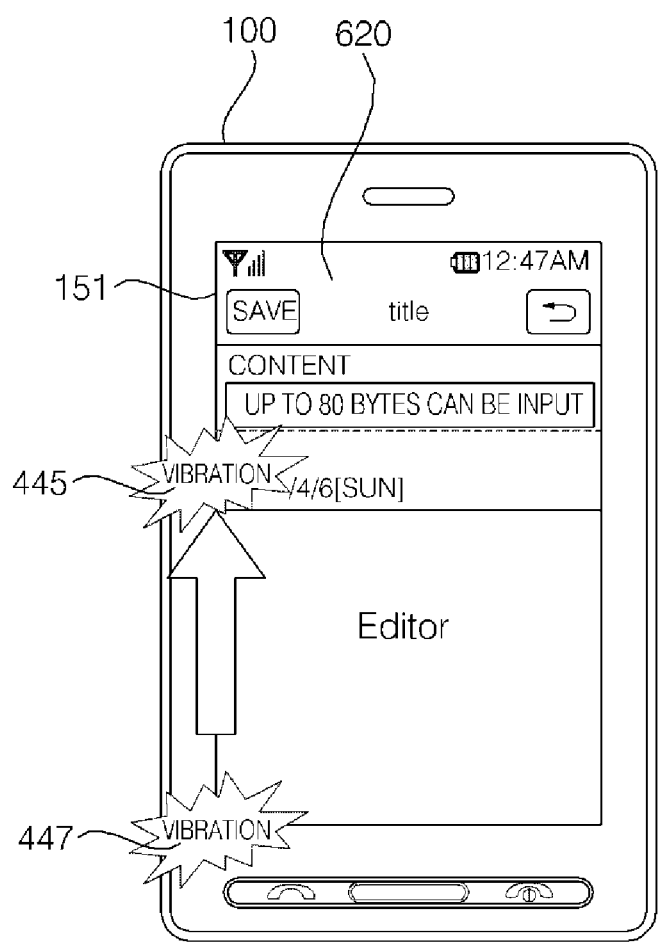

FIGS. 13A through 13C illustrate exemplary editor screens displayed on the display module 151 in accordance with various embodiments of the invention. For example, as shown in FIG. 13A, if a "Content" section in the editor screen 600 is selected in response to a touch input, an editing page can gradually appear or disappear from the editor screen 600, as shown in the editor screen 610 in FIG. 13B. Furthermore, as shown in FIG. 13C, a haptic effect, such as vibrations 445 and 447, can be generated along a direction of the movement of the editor screen 620. In addition, if a new screen is displayed over an existing page or if a new page gradually appears from the bottom of an existing page, then a haptic effect can also be generated.

Figure 14A:
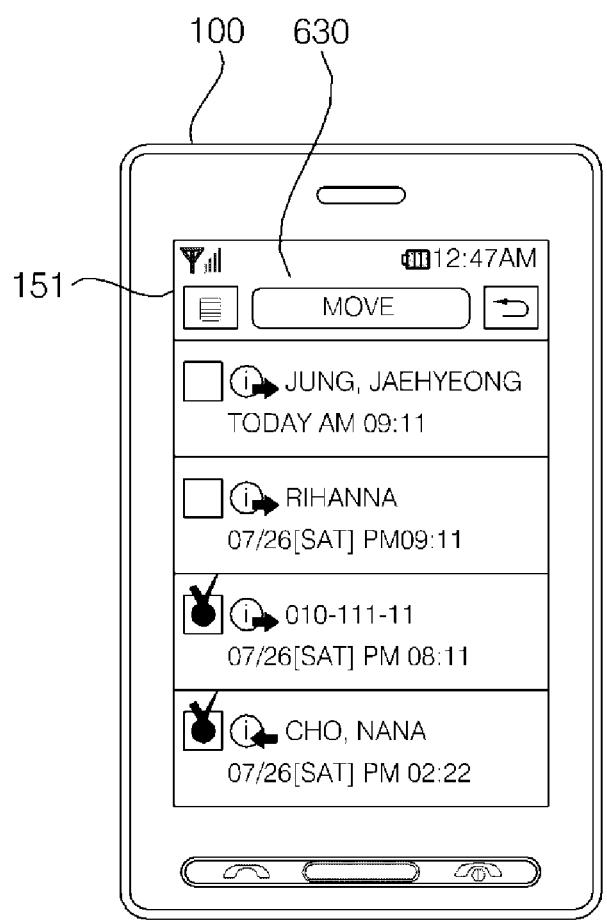
FIGS. 14A and 14B illustrate exemplary phonebook screens displayed on the display module of the mobile terminal in accordance with various embodiments of the invention.
Figure 14B:
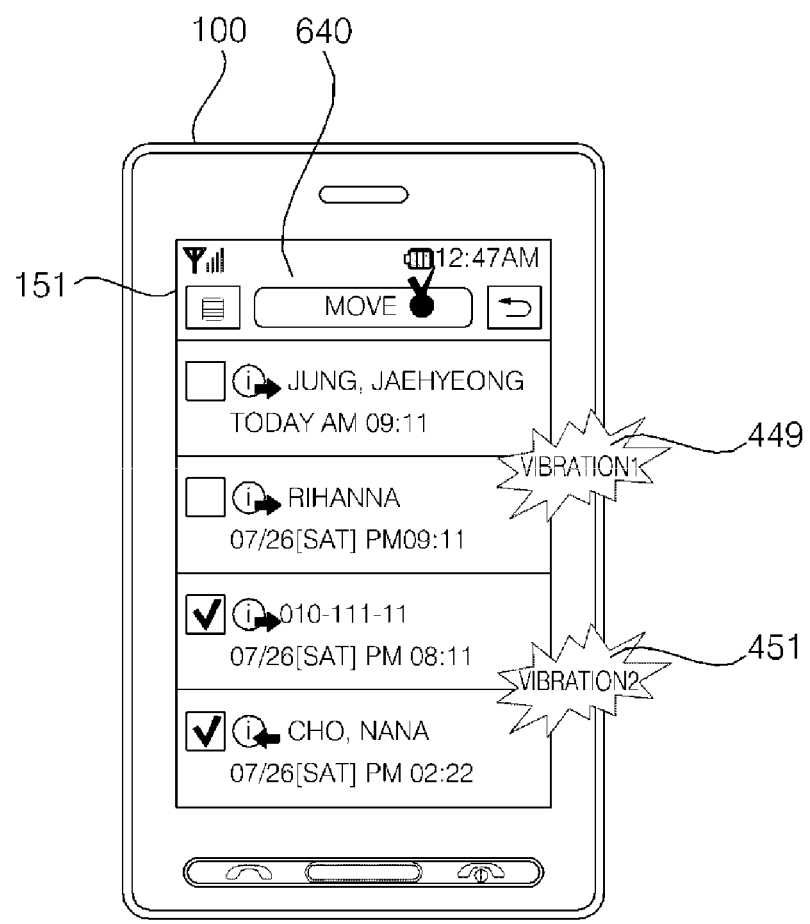

FIGS. 14A and 14B illustrate exemplary phonebook screens displayed on the display module 151 in accordance with various embodiments of the invention. For example, with reference to FIG. 14A, if a plurality of items displayed on the phonebook screen 630 are moved, deleted or copied, a complex haptic effect, such as a haptic effect including a combination of vibrations, e.g., "VIBRATION1" 449 and "VIBRATION2" 451, can be generated as shown on the phonebook screen 640 in FIG. 14B.

Figure 15:
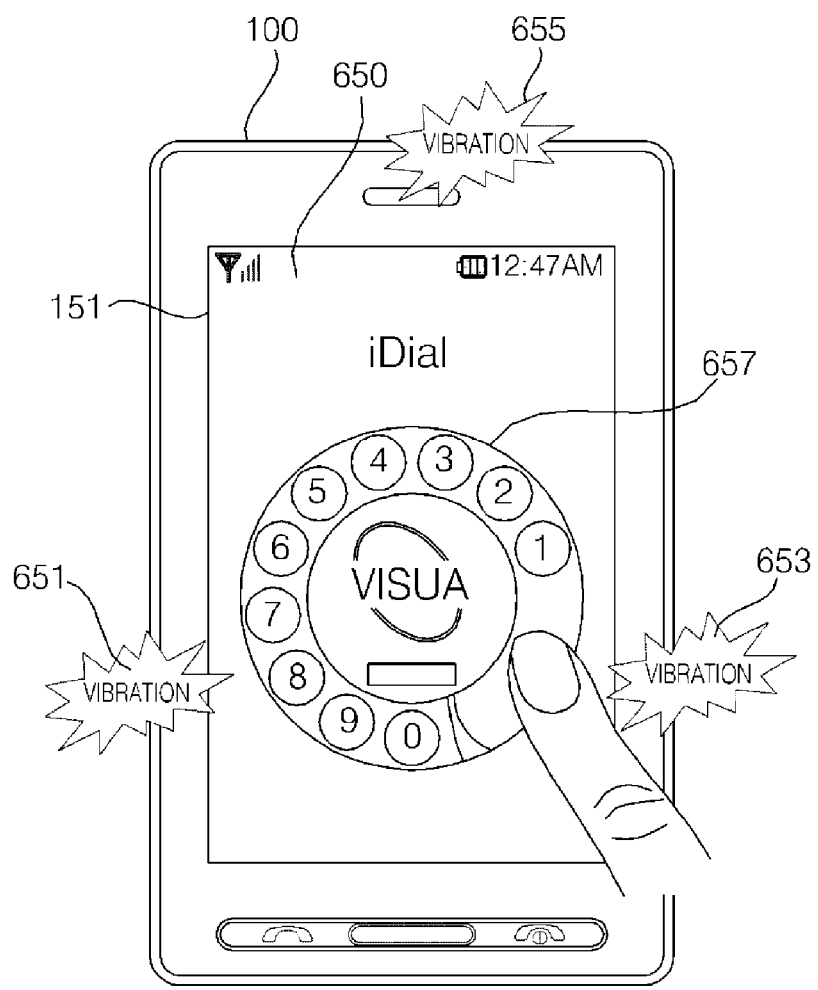
FIG. 15 illustrates an exemplary analog phone dial screen displayed on the display module of the mobile terminal in accordance with various embodiments of the invention.

FIG. 15 illustrates an exemplary analog phone dial screen displayed on the display module 151 in accordance with various embodiments of the invention. For example, with reference to FIG. 15, when the user dials each number of a phone number using the dial 657, a haptic effect, such as one or more of vibrations 651, 653 and 655, can be generated. In one embodiment, a different haptic effect can be generated for each different number dialed by the user. For instance, during operation, the terminal may receive a dragging user input initiating at a first location which generally corresponds to a selected one of the dial keys (e.g., one of 1-9 or 0) and extending in a generally counter-clockwise manner about a center-point defined by the dial keys. Next, responsive to each instance of the receiving of the dragging user input, a third haptic feedback at the mobile terminal may be generated such that the feedback may be repeated a number of times which correspond to the input number. These operations may be repeatedly performed to form a call number with the input numbers.

As still a further example, haptic feedback may be implemented to facilitate position location or directional applications such as GPS. For instance, the mobile terminal may display a map which represents a general location at which the mobile terminal is located. In this embodiment, a haptic feedback may be provided at one or more of a plurality of different locations of the mobile terminal (e.g., top, bottom, right, left, top-right, top-left, bottom-right, bottom-left, etc.) to reflect a suggested and corresponding change in travel direction along a suggested travel path. In general, each of the different locations correspond to a different direction of travel along the suggested travel path. For instance, if the directional application indicates that the user is to make a left turn, the haptic feedback will active on the left side of the terminal. Other turn indication may likewise be implemented using similar haptic feedback (e.g., right turns using right-side haptic feedback, etc.).

Figure 16A:
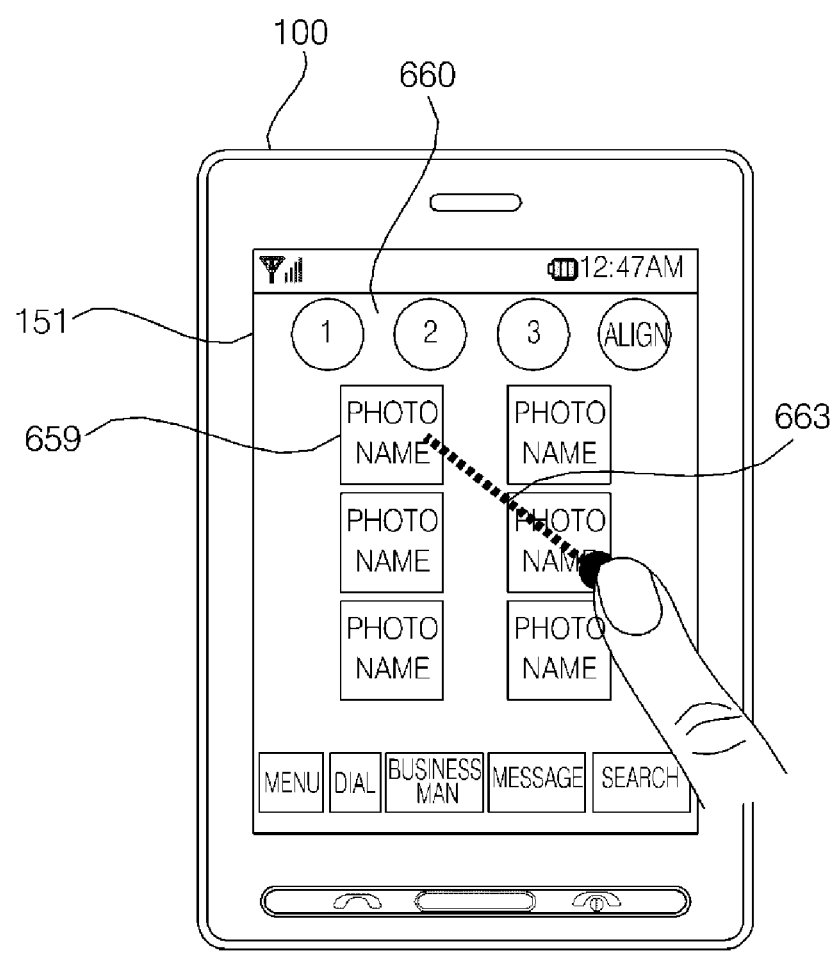
FIGS. 16A and 16B illustrate exemplary thumbnail image screens displayed on the display module of the mobile terminal in accordance with various embodiments of the invention.
Figure 16B:
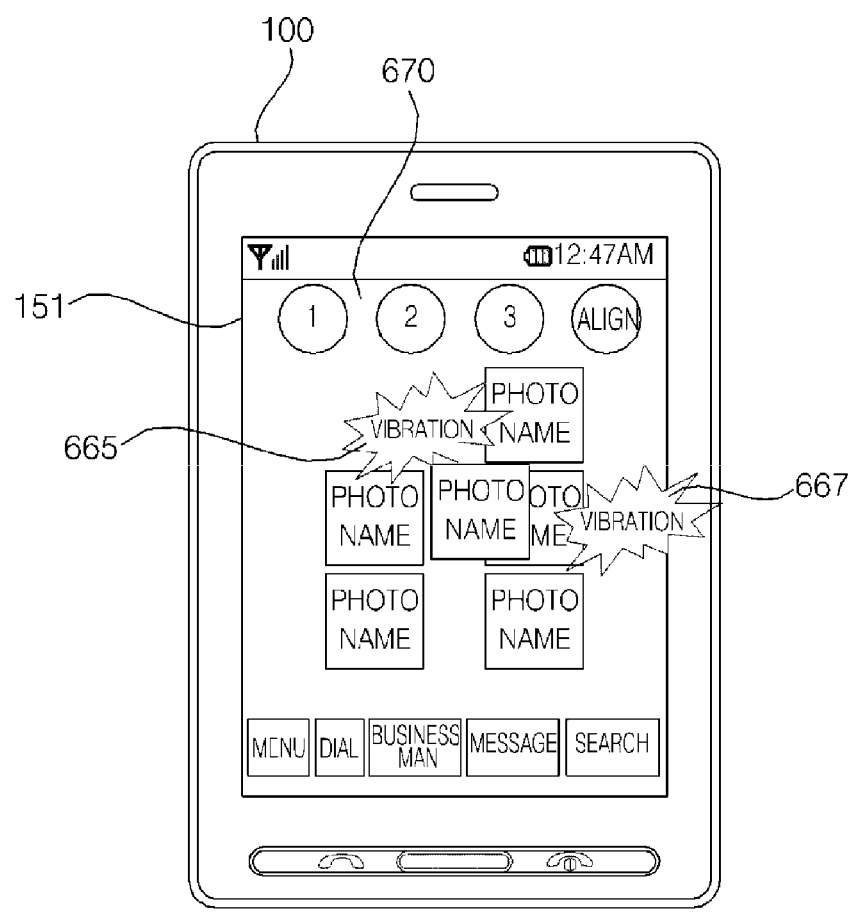

FIGS. 16A and 16B illustrate exemplary thumbnail image screens displayed on the display module 151 in accordance with various embodiments of the invention. For example, with reference to FIG. 16A, if a user selects one of a plurality of thumbnail images displayed on the thumbnail image screen 660, such as the thumbnail image 659, then a first haptic effect, such as a vibration 665, can be generated. Thereafter, if the selected thumbnail image is dragged and dropped over another thumbnail image via an input 663, the first haptic effect and a second thumbnail image can be generated at substantially the same time. In addition, if one screen is laid over another screen, then two haptic effects respectively corresponding to the two screens, such as vibrations 665 and 667, can be generated at substantially the same time.

Figure 17A:
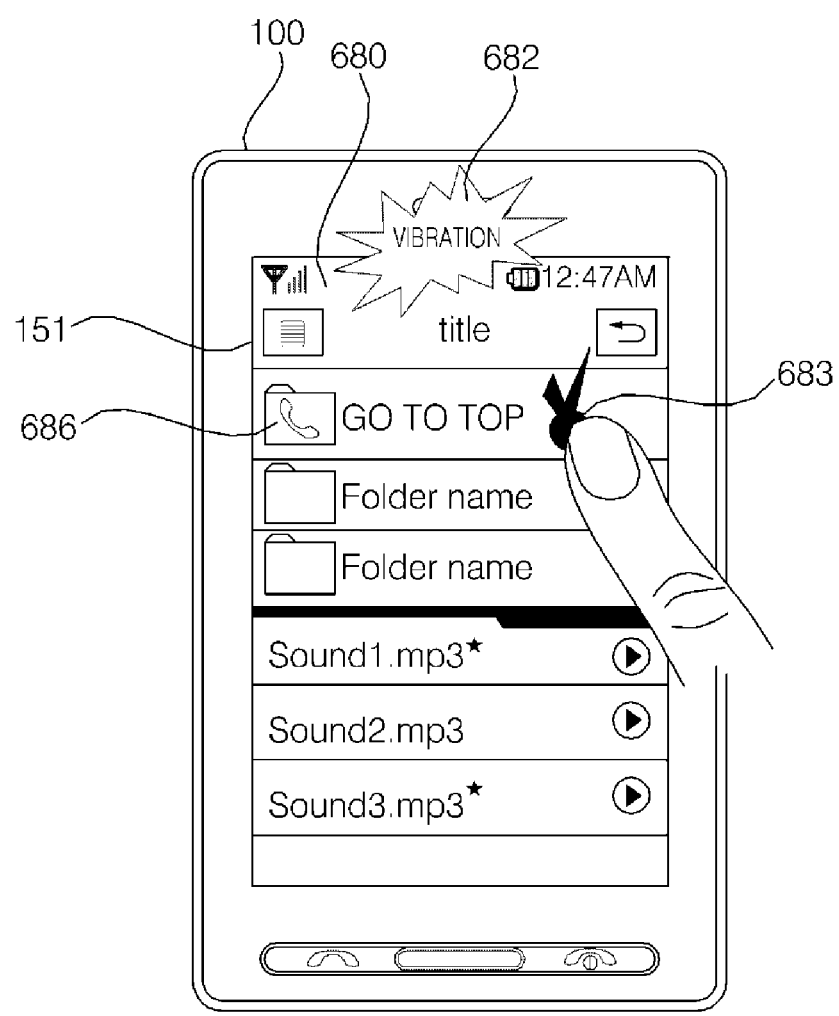
FIGS. 17A and 17B illustrate exemplary content search screens displayed on the display module of the mobile terminal in accordance with various embodiments of the invention.
Figure 17B:
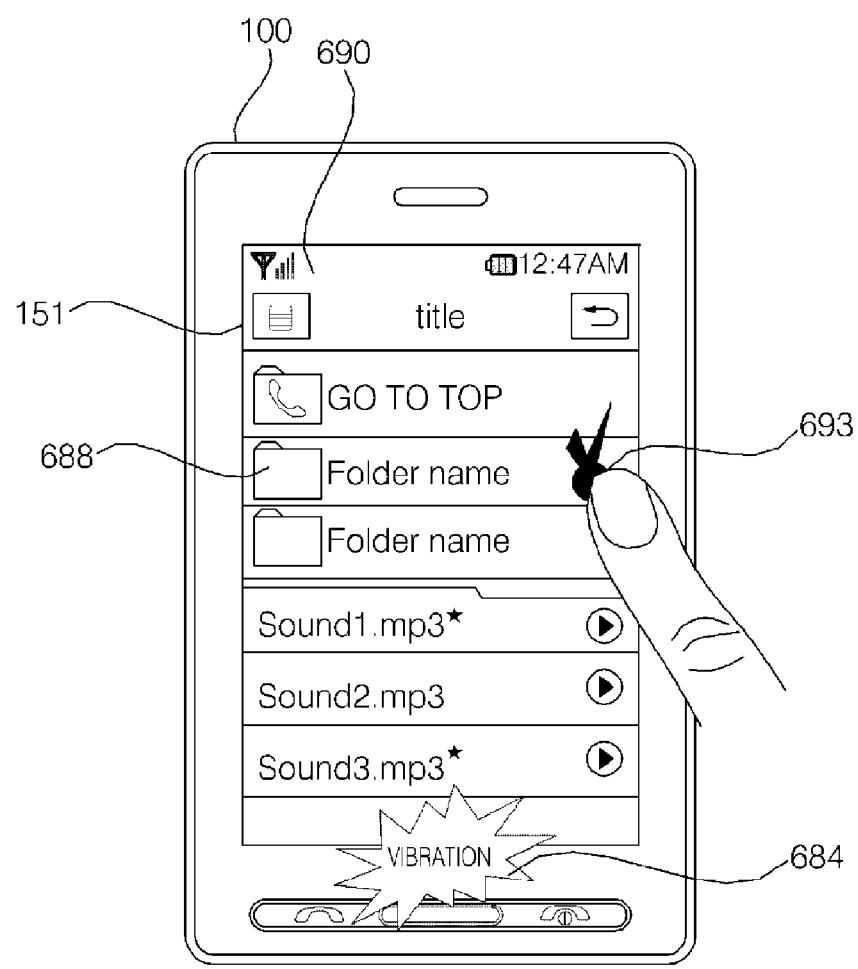

FIGS. 17A and 17B illustrate exemplary content search screens displayed on the display module 151 in accordance with various embodiments of the invention. For example, with reference to FIG. 17A, if the user chooses to open a parent folder, such as parent folder 686, when the content search screen 680 is displayed, then a haptic effect, such as a vibration 682, can be generated at the top of the content search screen 680. On the other hand, with reference to FIG. 17B, if the user chooses to open a sub-folder, such as subfolder 688, when the content search screen 690 is displayed, then a haptic effect, such as a vibration 684, can be generated at the bottom of the content search screen 690.

If one of a plurality of files displayed on the content search screen 680 or 690 is selected, a complex haptic effect can be generated by combining a plurality of haptic effects according to whether the selected file is an image file, a moving image file or a file that cannot be executed.

Figure 18A:
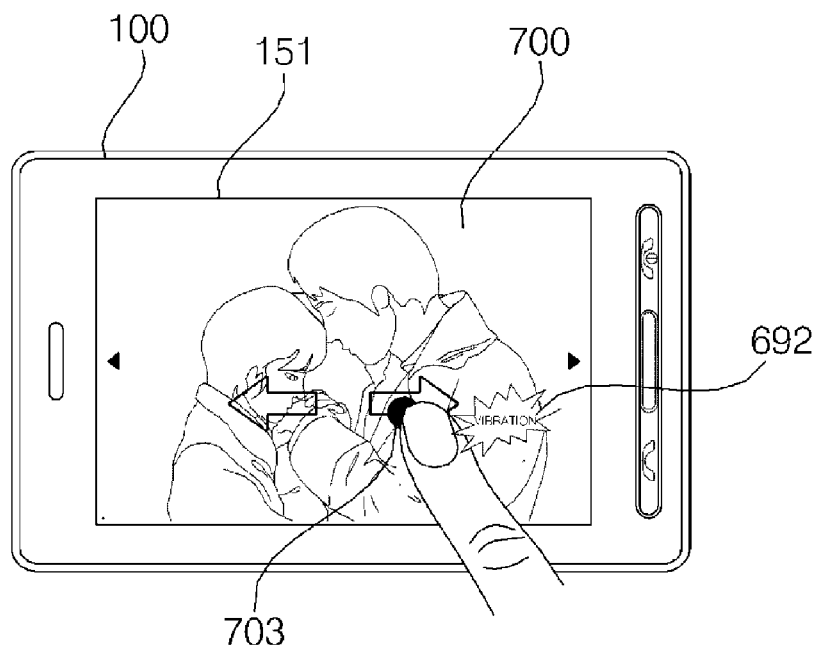
FIGS. 18A and 18B illustrate exemplary moving image play screens displayed on display module of the mobile terminal in accordance with various embodiments of the invention.
Figure 18B:
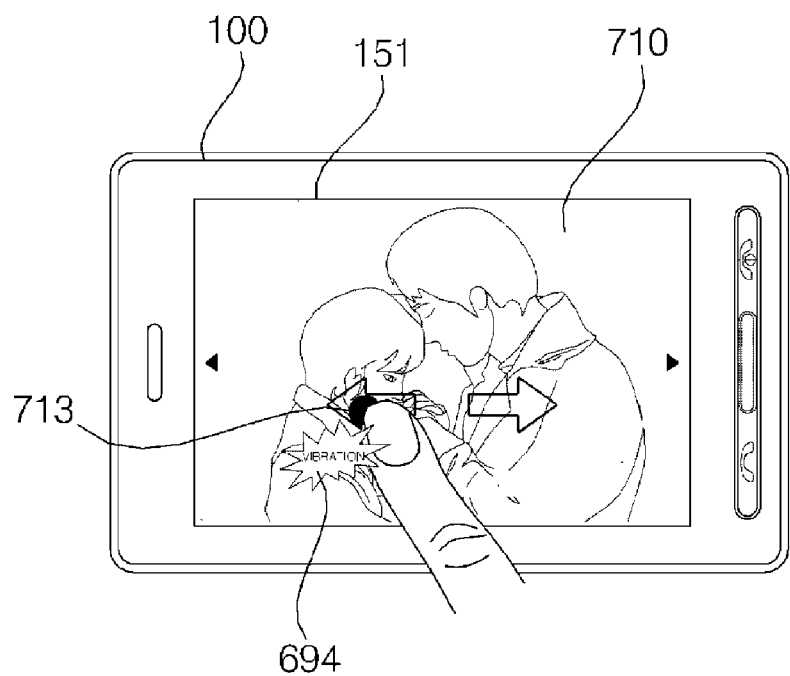

FIGS. 18A and 18B illustrate exemplary moving image play screens displayed on the display module 151 in accordance with various embodiments of the invention. For example, with reference to FIG. 18A, if an icon for fast-forwarding a moving image file currently being played is selected on screen 700, then a haptic effect, such as a vibration 692, can be generated. For example, with reference to FIG. 18B, if an icon for fast-rewinding a moving image file currently being played is selected on screen 710, then a haptic effect, such as a vibration 694, can be generated. The haptic effect can be generated at different locations according to whether the selected icon corresponds to fast-forwarding or rewinding the moving image file currently being played.

In addition, if a plurality of notes are selected during a musical instrument-playing mode, a plurality of haptic effects respectively corresponding to the plurality of notes can be generated at substantially the same time. If one screen is replaced with another screen, a complex haptic effect can be generated by combining a plurality of haptic effects so as to provide a sensation similar to opening a zipper. If the mobile terminal 100 is released from a screen-lock state, various haptic effects can also be generated by combining a plurality of haptic effects.

FIGS. 19 through 22 illustrate exemplary diagrams for explaining the method described above with respect to FIG. 7.

Figure 19A:
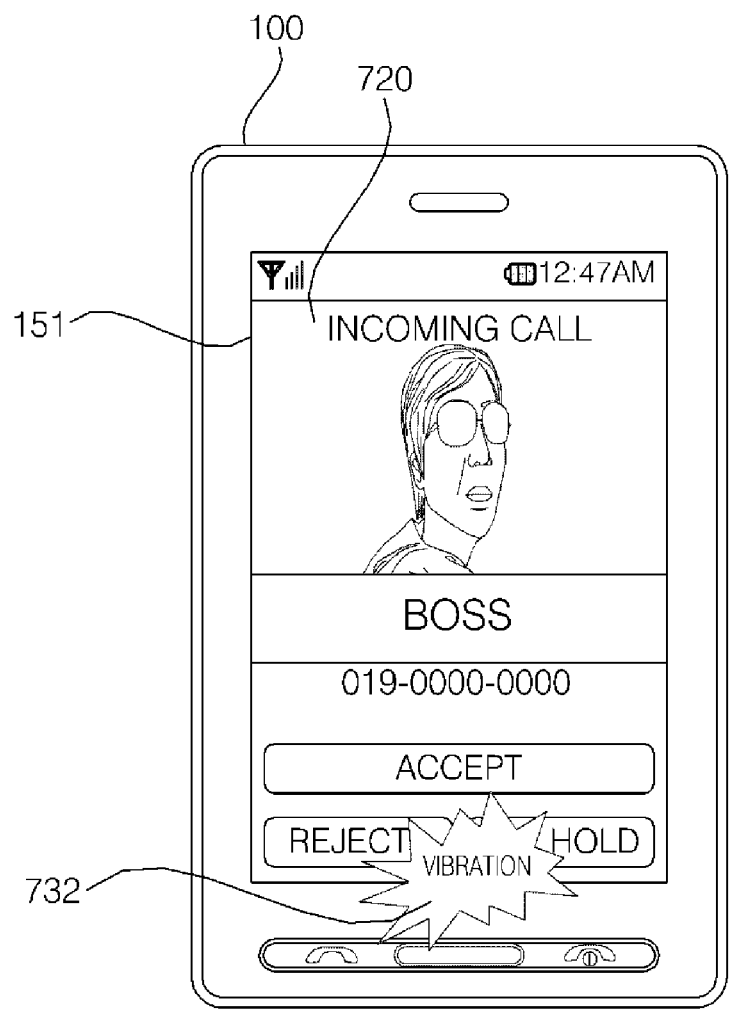
FIGS. 19A through 19C illustrate exemplary call reception screens displayed on the display module of the mobile terminal in accordance with various embodiments of the invention.
Figure 19B:
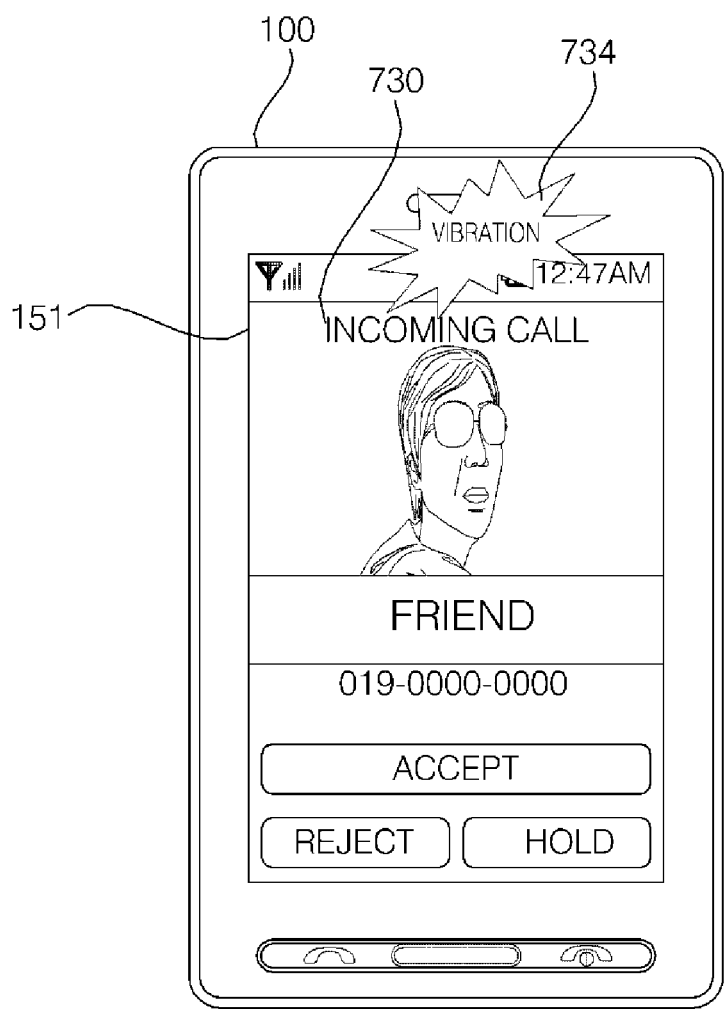
Figure 19C:
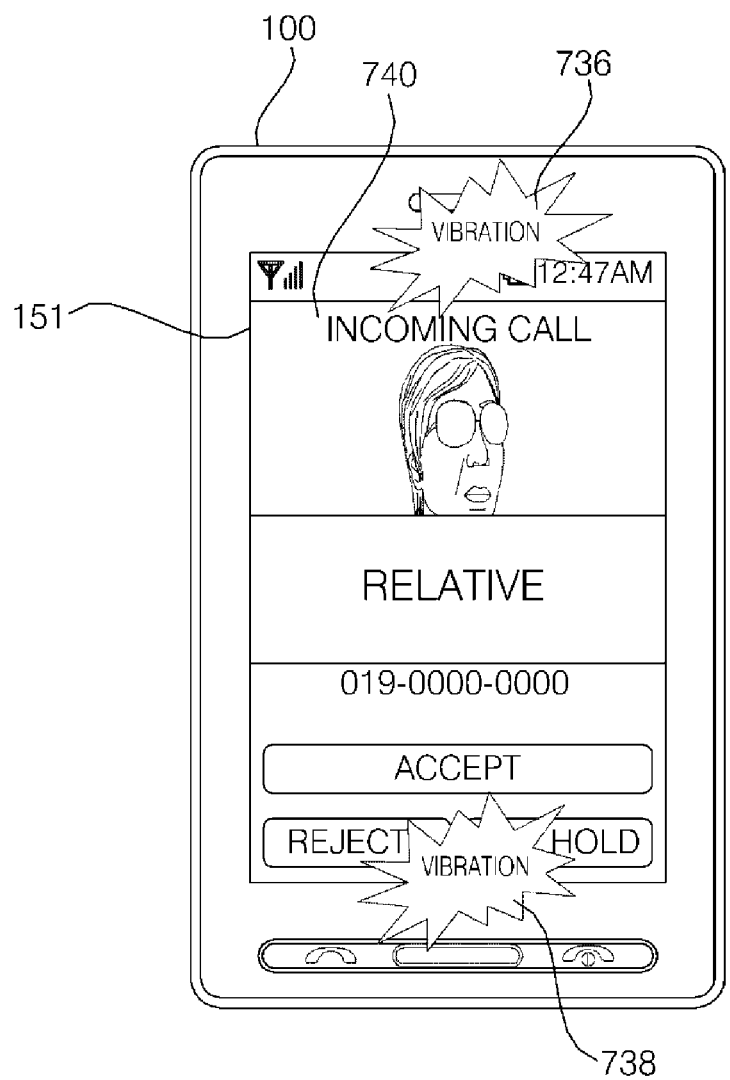

FIGS. 19A through 19C illustrate exemplary call reception screens displayed on the display module 151 in accordance with various embodiments of the invention. For example, with reference to FIG. 19A, a haptic effect, such as a vibration 732, can be generated at the bottom of the call reception screen 720 during an incoming call from the caller identified as "BOSS." As another example, with reference to FIG. 19B, a haptic effect, such as a vibration 734, can be generated at the top of the call reception screen 730 during an incoming call from the caller identified as "FRIEND." As a further example, with reference to FIG. 19C, multiple haptic effects, such as vibrations 736 and 738, can be generated at the top and bottom of the call reception screen 740 during an incoming call from the caller identified as "RELATIVE."

Accordingly, as described with respect to FIGS. 19A through 19C, different haptic effects can be generated for different callers. The location or pattern of a haptic effect generated by the mobile terminal 100 can vary according to the biorhythm and emotional state of each caller.

Figure 20A:
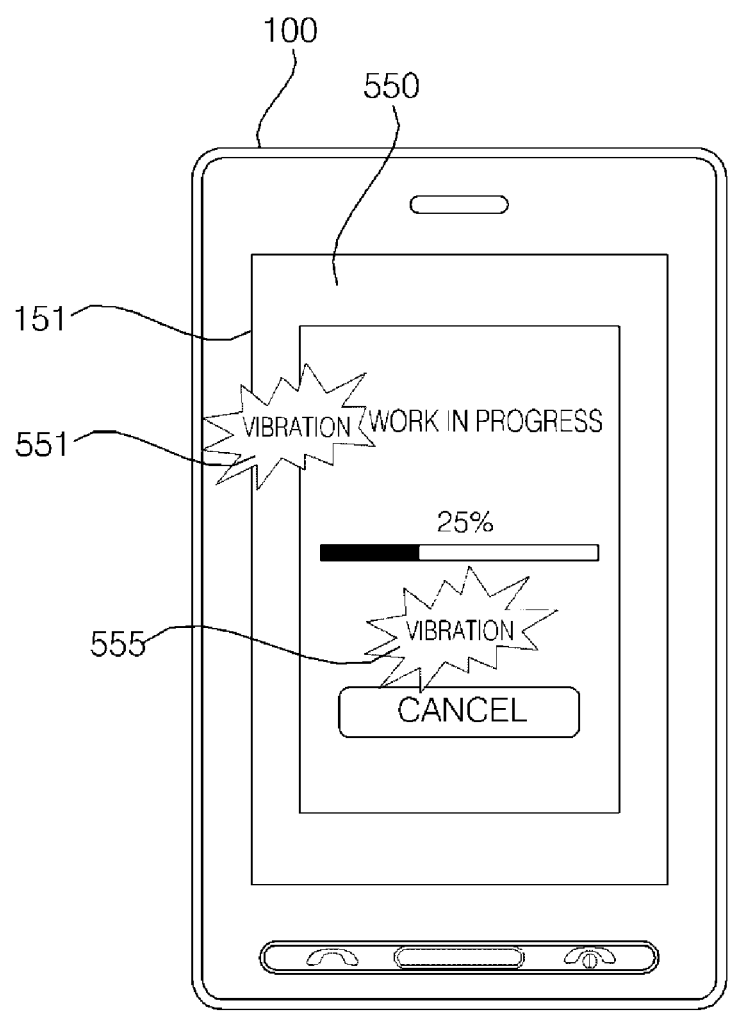
FIGS. 20A and 20B illustrate exemplary progress bar screens displayed on the display module of the mobile terminal in accordance with various embodiments of the invention.
Figure 20B:
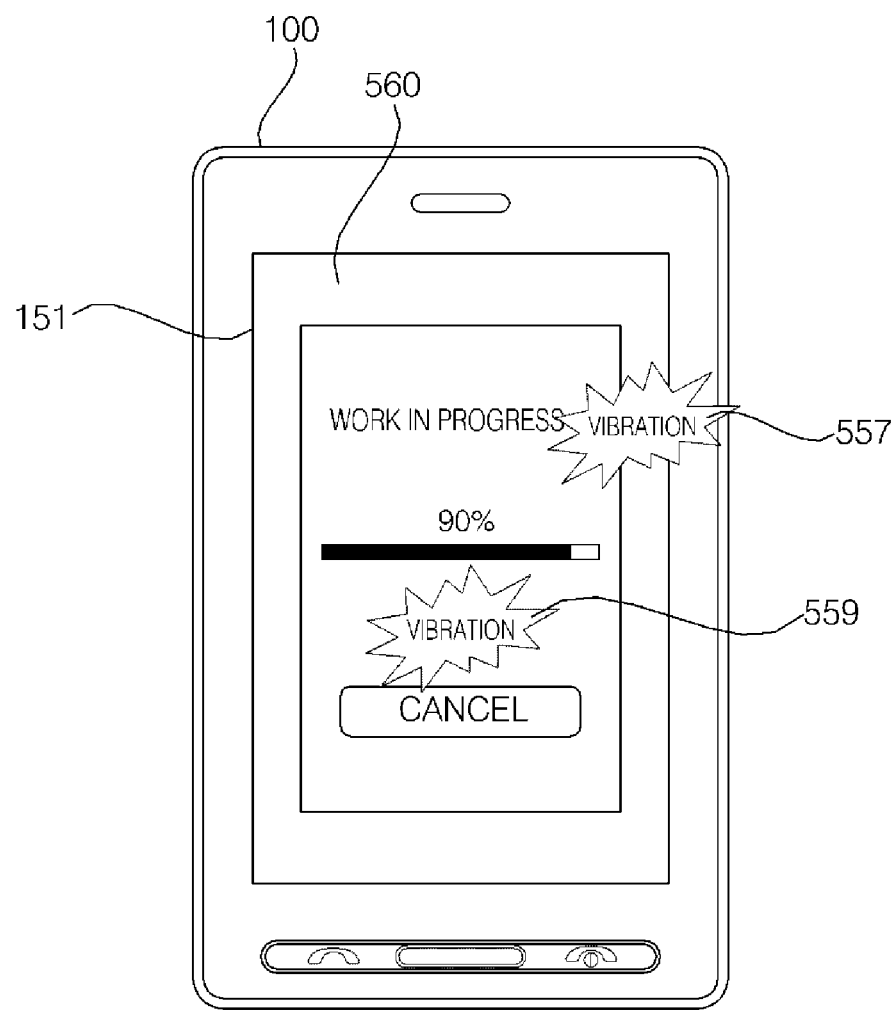

FIGS. 20A and 20B illustrate exemplary progress bar screens displayed on the display module 151 in accordance with various embodiments of the invention. For example, with reference to FIG. 20A, a directional haptic effect can be generated by combining a plurality of haptic effects, such as vibrations 551 and 555, that can be generated on the left side and the center of the screen 550 of the display module 151. As another example, with reference to FIG. 20B, a directional haptic effect can be generated by combining a plurality of haptic effects, such as vibrations 557 and 559, that can be generated on the right side and the center of the screen 560 of the display module 151. In this manner, it is possible to alert the user with respect to the progress of an operation currently being performed by the controller 180. The present invention can be directly applied to a progress bar displayed during a broadcast channel search/registration operation.

Figure 21A:
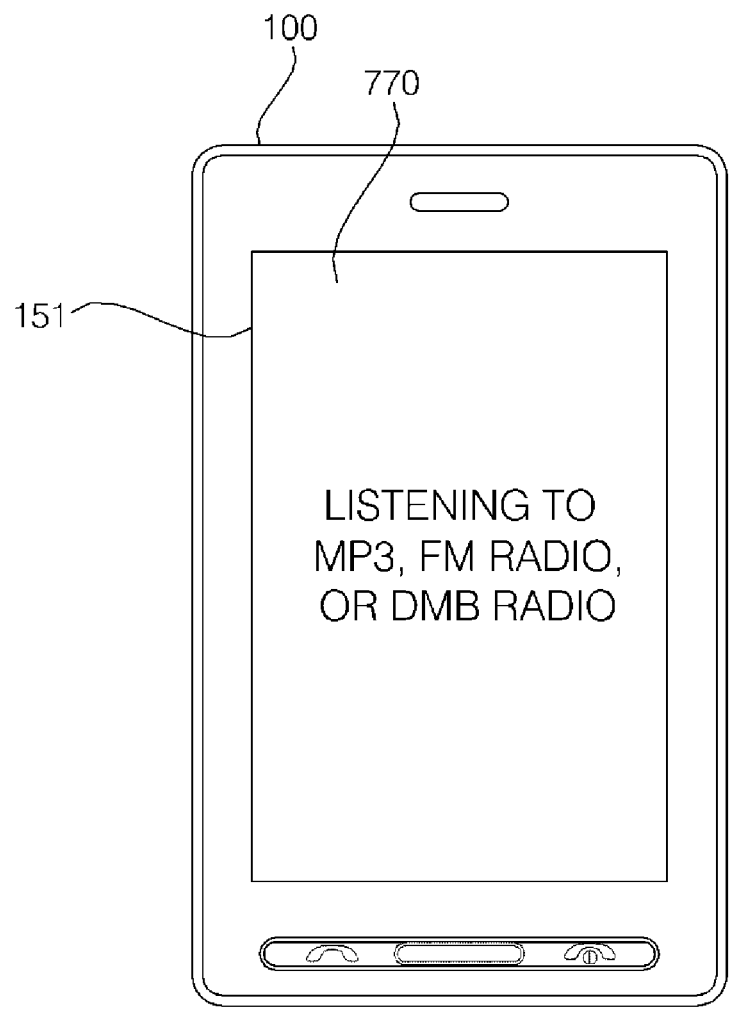
FIGS. 21A through 21C illustrate exemplary call reception screens displayed by the display module of the mobile terminal in accordance with various embodiments of the invention.
Figure 21B:
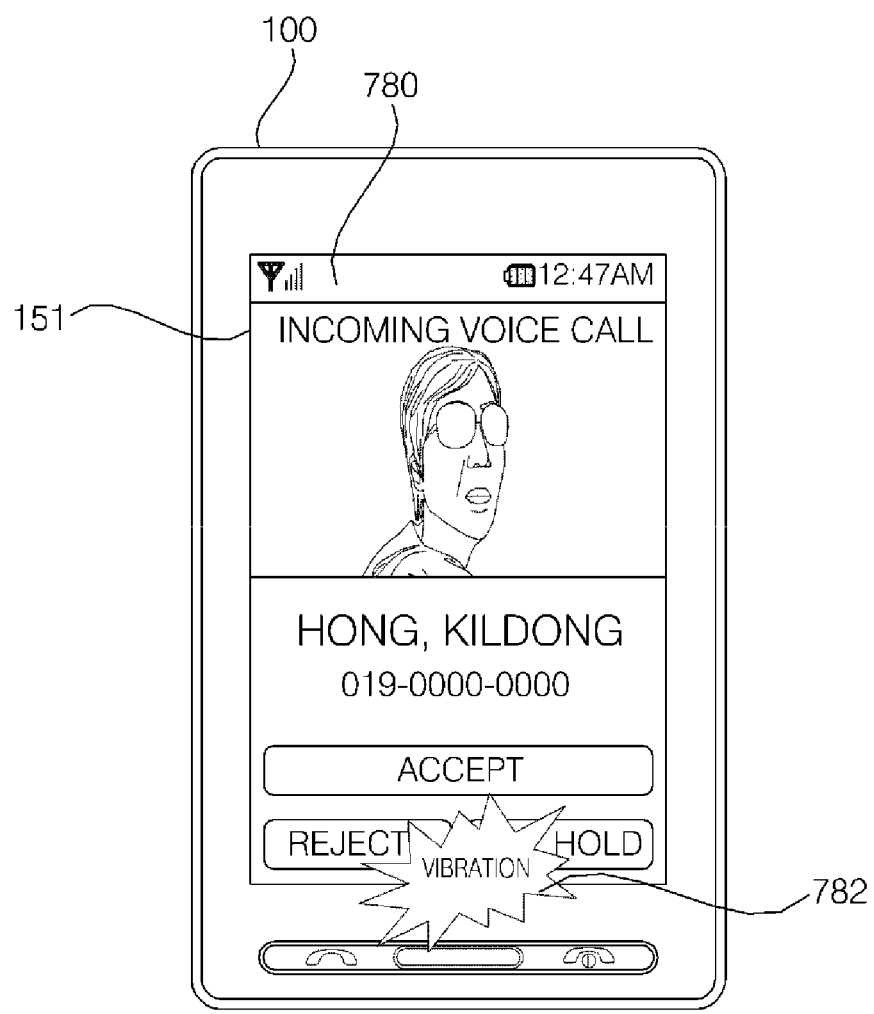
Figure 21C:
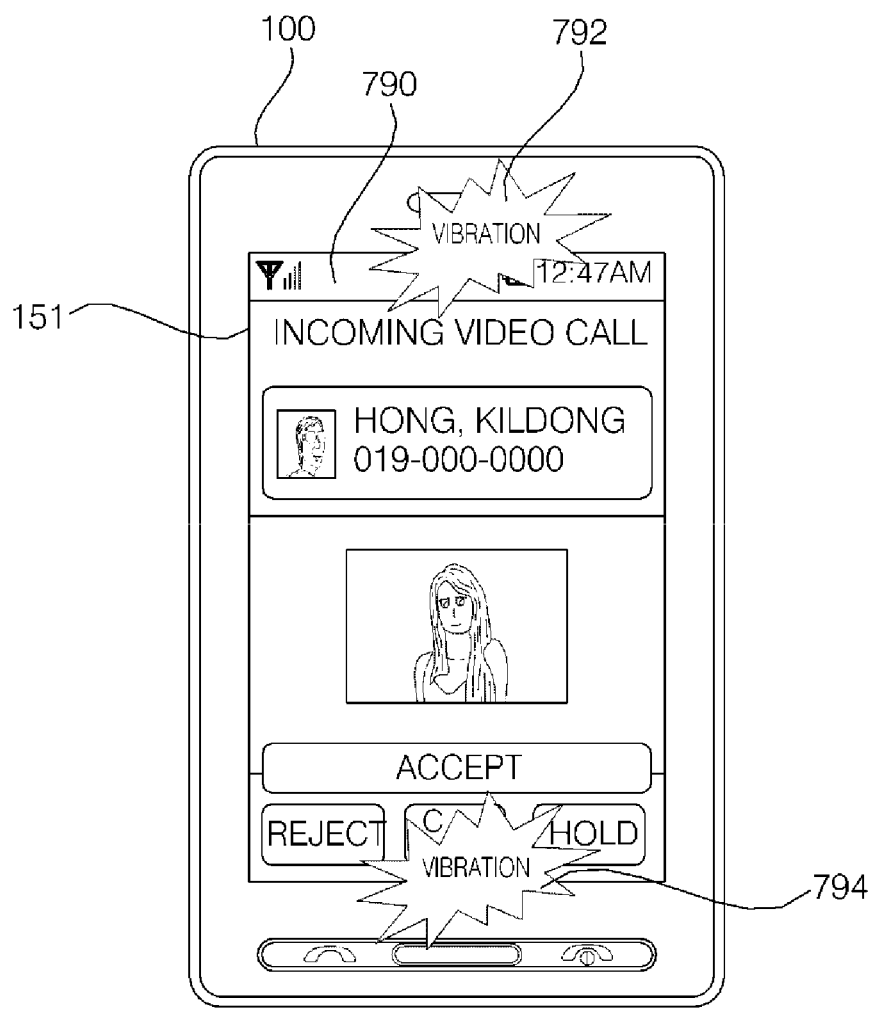

FIGS. 21A through 21C illustrate exemplary call reception screens displayed by the display module 151 in accordance with various embodiments of the invention. For example, with reference to FIG. 21A, if a voice call is received during a predetermined operating mode, such as an MP3, FM radio, or digital multimedia broadcasting (DMB) radio mode, then a haptic effect, such as a vibration 782, can be generated at the bottom of the screen 780 as shown in FIG. 21B. As another example, with reference to FIG. 21C, if a video call is received during a predetermined operating mode, such as an MP3, FM radio, or digital multimedia broadcasting (DMB) radio mode, then haptic effects, such as vibrations 792 and 794, can be generated at the top and bottom of the screen 790 as shown in FIG. 21C. If a call is received during a conference call or if two or more calls are merged, various haptic effects can be generated by combining a plurality of haptic effects.

Figure 22A:
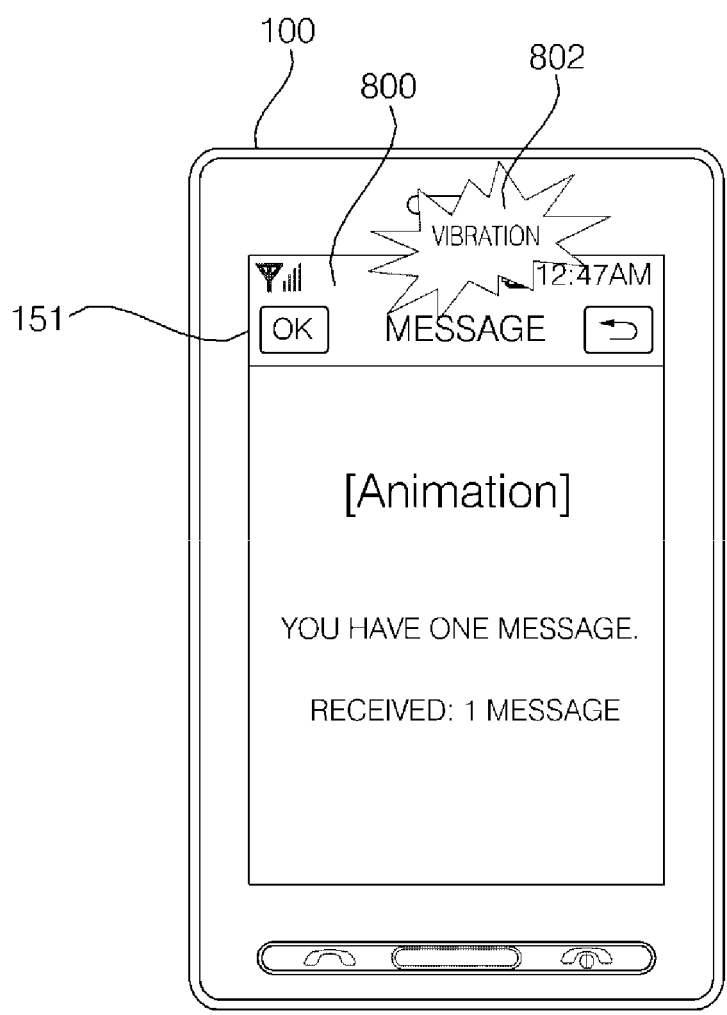
FIGS. 22A and 22B illustrate exemplary message reception screens displayed on the display module of the mobile terminal in accordance with various embodiments of the invention.
Figure 22B:
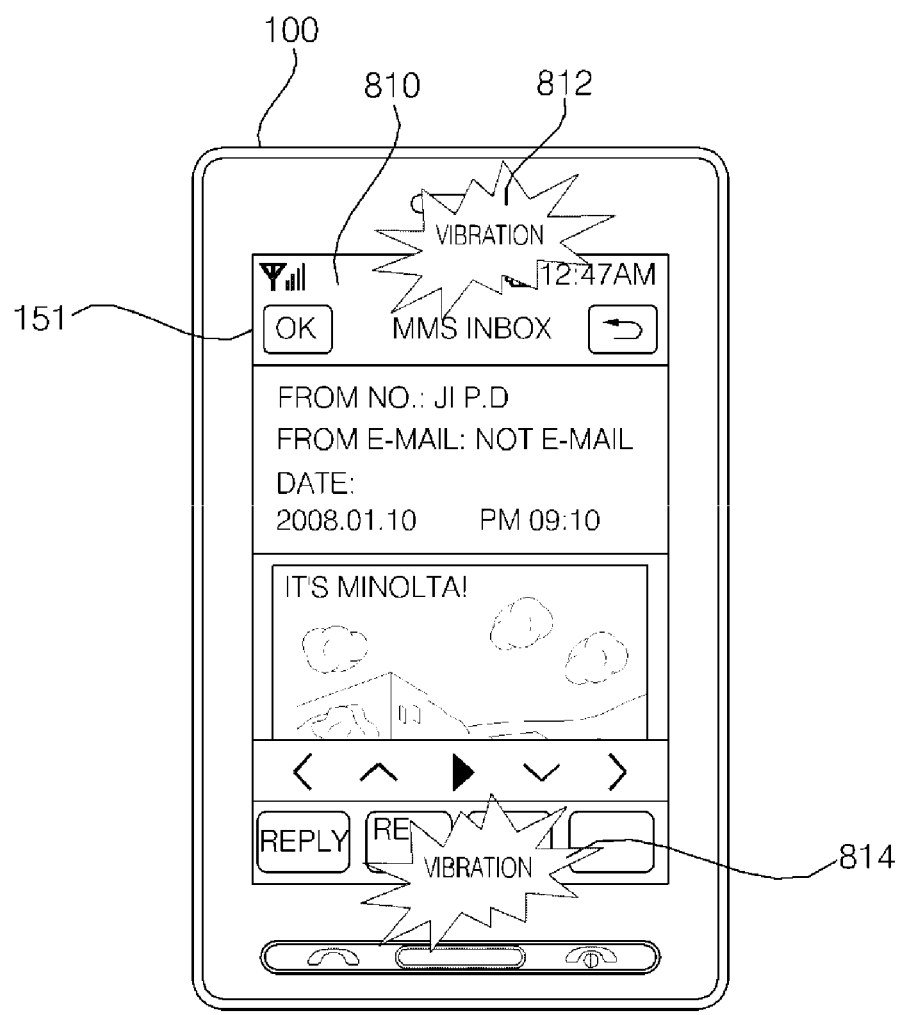

FIGS. 22A and 22B illustrate exemplary message reception screens displayed on the display module 151 in accordance with various embodiments of the invention. For example, with reference to FIG. 22A, if a voice message is received by the mobile terminal 100, then a haptic effect, such as a vibration 802, can be generated. As another example, with reference to FIG. 22B, if a Short Message Service (SMS) or a Multimedia Messaging Service (MMS) message is received by the mobile terminal 100, then a haptic effect, such as vibrations 812 and 814, can be generated. For example, the location and/or the pattern of the haptic effects described above can vary according to the type of the received message, such as whether the received message is an SMS message or an MMS message.

In this manner, a user of the mobile terminal 100 can easily differentiate an incoming voice call from an incoming video call, and can further differentiate an SMS message from an MMS message, based on the location and pattern of a haptic effect generated by the mobile terminal 100.

Therefore, different haptic effects can be generated for different types of events. Moreover, various haptic effects can be generated upon the occurrence of various types of events, such as an alarm event or a scheduling event.

It should be understood that the mobile terminal 100 and the methods of controlling the mobile terminal 100 according to the exemplary embodiments described herein are not restricted to such exemplary embodiments. Therefore, variations and combinations of the exemplary embodiments described herein can fall within the scope of the invention.

The present invention can be realized as code that can be read by a processor (such as a mobile station modem (MSM)) included in a mobile terminal and that can be written on a computer-readable recording medium. The computer-readable recording medium can be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to provide various haptic effects for different types of user inputs or events by using a plurality of haptic modules. Therefore, it is possible for a user to easily identify the type of user input or event not only with his or her sense of vision but also with his or her sense of touch. In addition, it is possible to provide various benefits such as entertainment and convenience and prevent the malfunction of a mobile terminal.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for providing feedback at a mobile terminal, the method comprising:
    displaying a screen comprising a first input group and a second input group, wherein the first input group includes one or more first user-selectable items and the second input group includes one or more second user-selectable items;

detecting a first user input relative to a displayed location of a user-selectable item of the first input group, wherein the first user input comprises a single touch input controlling, responsive to the first user input, a first haptic device to generate a first haptic feedback at a first location of the mobile terminal;

detecting a second user input relative to a displayed location of a user-selectable item of the second input group, wherein the second user input comprises a single touch input, and wherein the first user input occurs at a time that is different than a time that the second user input occurs controlling, responsive to the second user input, a second haptic device to generate a second haptic feedback at a second location of the mobile terminal;

wherein the first and second haptic devices are disposed at different locations in the mobile terminal, and wherein the first and second haptic feedbacks are differentiated from each other in terms of at least one of direction, intensity, or pattern; and displaying dial keys in a substantially circular arrangement on a display of the mobile terminal, wherein each of the dial keys relates to a particular number;

receiving a dragging user input initiating at a third location which generally corresponds to a selected one of the dial keys and extending in a generally counter- clockwise manner about a center-point defined by the dial keys, wherein the dragging user input represents an input number that corresponds to the number of the selected one of the dialed keys, generating, responsive to each instance of the receiving of the dragging user input, a third haptic feedback at the mobile terminal, the third haptic feedback repeating a number of times which correspond to the input number; and repeatedly performing the receiving of the dragging user input to form a call number comprising a plurality of the input numbers.

2. The method according to claim 1, wherein the second haptic feedback begins at a point of time that occurs after the first haptic feedback has ceased.

3. The method according to claim 1, wherein the second haptic feedback occurs during a point of time that partially overlaps in time the generated first haptic feedback.

4. The method according to claim 1, wherein the first and second user inputs represent actual user contact with the mobile terminal.

5. The method according to claim 1, wherein the first and second user inputs represent a proximity touch input that is non-actual contact proximate to the display of the mobile terminal.

6. The method according to claim 1, wherein the first and second user inputs comprise a dragging input or a tap input.

7. The method according to claim 1, wherein the first and second haptic feedbacks are vibration effects.

8. The method according to claim 1, further comprising:
displaying a plurality of objects on the display of the mobile terminal;
detecting a third user input relative to a displayed location of a selected object of the plurality of objects;
changing the displayed location of the selected object corresponding to a location at which the third user input is detected;
initiating a drop operation when the third user input ceases, the drop operation causing the selected object to be displayed at a last displayed location corresponding to the location at which the third user input was last detected; and
generating a fourth haptic feedback at third and fourth locations of the mobile terminal when the last displayed location of the selected object overlaps with at least a portion of a displayed location of any of the other displayed plurality of objects.

9. The method according to claim 8, wherein each of the plurality of objects represent an image.

10. The method according to claim 8, wherein each of the plurality of objects represent a window.

11. The method according to claim 1, further comprising:
displaying one of a plurality of images on the display of the mobile terminal;
receiving a further dragging user input relative to a displayed location of a selected image of the plurality of images, the further dragging user input comprising a velocity;
generating, responsive to the further dragging user input, a fourth haptic feedback at the mobile terminal, the fourth haptic feedback occurring at a plurality of locations and having an intensity which corresponds to the velocity of the further dragging user input; and
displaying another one of the plurality of images on the display responsive to the further dragging user input.

12. The method according to claim 1, further comprising:
displaying one of a plurality of images on the display of the mobile terminal;
receiving a further dragging user input relative to a displayed location of a selected image of the plurality of images, the further dragging user input comprising a direction;
generating, responsive to the further dragging user input, a fourth haptic feedback at the mobile terminal, the fourth haptic feedback occurring at a plurality of locations in a staggered manner that generally reflects the direction of the further dragging user input; and
displaying another one of the plurality of images on the display responsive to the further dragging user input.

13. The method according to claim 1, further comprising:
displaying a map on the display of the mobile terminal, the map representing a general location at which the mobile terminal is located; and
providing fourth haptic feedback at one of a plurality of different locations of the mobile terminal to reflect a suggested and corresponding change in travel direction along a suggested travel path, wherein each of the plurality of different locations corresponds to a different direction of travel along the suggested travel path.

14. The method according to claim 1,
wherein the screen comprises a character input screen; and
wherein the first user input is for selecting a consonant letter, which is one of the one or more first user-selectable items of the first group, and the second user input is for selecting a vowel, which is one of the one or more second user-selectable items of the second group.

15. The method according to claim 1, wherein the first user input is for
dragging a user-selectable item of the first input group.

16. The method according to claim 1,
wherein the screen comprises a playback screen of a multimedia file; and
wherein one user-selectable item of the first input group is for rewinding the multimedia file currently being played, and one user-selectable item of the second input group is for forwarding the multimedia file currently being played.

17. The method according to claim 1, further comprising:
displaying a message interface to permit user entry of a message, wherein the first user-selectable items comprise a first plurality of alphabetic characters and the second user-selectable items comprise a second plurality of alphabetic characters that are different from the first plurality of alphabetic characters.

18. A mobile terminal, comprising:
a display;
an input sensor configured to detect first and second user inputs relative to a location of the display;
a first haptic device configured to generate a first haptic feedback at a first location;
a second haptic device configured to generate a second haptic feedback at a second location, wherein the first and second haptic devices are disposed at different locations in the mobile terminal; and
a controller configured to:
cause the display to display a screen comprising a first input group and a second input group, wherein the first input group includes one or more first user-selectable items and the second input group includes one or more second user-selectable items;
detect, via the input sensor, the first user input relative to a displayed location of a user-selectable item of the first input group, wherein the first user input comprises a single touch input;
control, responsive to the first user input, the first haptic device to generate a first haptic feedback at a first location of the mobile terminal;
detect, via the input sensor, the second user input relative to a displayed location of a user-selectable item of the second input group, wherein the second user input comprises a single touch input, and wherein the first user input occurs at a time that is different than a time that the second user input occurs;
control, responsive to the second user input, the second haptic device to generate a second haptic feedback at a second location of the mobile terminal;
wherein the first and second haptic devices are disposed at different locations in the mobile terminal, and wherein the first and second haptic feedbacks are differentiated from each other in terms of at least one of direction, intensity, or pattern; and
cause the display to display dial keys in a substantially circular arrangement on the display of the mobile terminal, wherein each of the dial keys relates to a particular number;
receive a dragging user input initiating at a third location which generally corresponds to a selected one of the dial keys and extending in a generally counter-clockwise manner about a center-point defined by the dial keys, wherein the dragging user input represents an input number that corresponds to the number of the selected one of the dialed keys,
cause generating, responsive to each instance of the receiving of the dragging user input, a third haptic feedback at the mobile terminal, the third haptic feedback repeating a number of times which correspond to the input number; and
repeatedly perform the receiving of the dragging user input to form a call number comprising a plurality of the input numbers.

19. A method for providing feedback, the method comprising:
receiving, at a mobile terminal, a first communication event occurred from one or more other mobile terminals;
controlling, responsive to the first communication event, a first haptic device to generate a first haptic feedback;
receiving, at the mobile terminal, a second communication event occurred from one or more other mobile terminals;
controlling, responsive to the second communication event, a second haptic device to generate a second haptic feedback;
in response to reception of a third communication event, controlling the first and second haptic device at the same time to generate a third haptic feedback that is a combination of the first and second haptic feedbacks,
wherein the first and second haptic device are disposed at different locations in the mobile terminal, and wherein the first, second and third haptic feedbacks are differentiated from each other in terms of at least one of direction, intensity, or pattern; and
displaying dial keys in a substantially circular arrangement on a display of the mobile terminal, wherein each of the dial keys relates to a particular number;
receiving a dragging user input initiating at a first location which generally corresponds to a selected one of the dial keys and extending in a generally counter-clockwise manner about a center-point defined by the dial keys, wherein the dragging user input represents an input number that corresponds to the number of the selected one of the dialed keys,
generating, responsive to each instance of the receiving of the dragging user input, a fourth haptic feedback at the mobile terminal, the fourth haptic feedback repeating a number of times which correspond to the input number; and
repeatedly performing the receiving of the dragging user input to form a call number comprising a plurality of the input numbers.

20. The method according to claim 19, wherein the first and second communication events are different communication types, and the first and second communication events are one of a plurality of communication types including a short message service (SMS), a multimedia messaging service (MMS), email, a voice call, or a video call.

21. The method according to claim 19, wherein the first communication event requests from a third party and the second communication event requests from another third party.

* * * * *